(12) United States Patent
Sindhu et al.

(10) Patent No.: US 11,824,683 B2
(45) Date of Patent: *Nov. 21, 2023

(54) DATA PROCESSING UNIT FOR COMPUTE NODES AND STORAGE NODES

(71) Applicant: Microsoft Technology Licensing, LLC, Redmond, WA (US)

(72) Inventors: Pradeep Sindhu, Los Altos Hills, CA (US); Jean-Marc Frailong, Rancho Mirage, CA (US); Bertrand Serlet, Palo Alto, CA (US); Wael Noureddine, Santa Clara, CA (US); Felix A. Marti, San Francisco, CA (US); Deepak Goel, San Jose, CA (US); Rajan Goyal, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,081

(22) Filed: Mar. 29, 2022

(65) Prior Publication Data

US 2022/0224564 A1 Jul. 14, 2022

Related U.S. Application Data

(63) Continuation of application No. 16/031,921, filed on Jul. 10, 2018, now Pat. No. 11,303,472.
(Continued)

(51) Int. Cl.
*G06F 13/12* (2006.01)
*H04L 12/46* (2006.01)
(Continued)

(52) U.S. Cl.
CPC .......... *H04L 12/4633* (2013.01); *G06F 9/546* (2013.01); *G06F 12/0817* (2013.01);
(Continued)

(58) Field of Classification Search
CPC ............ H04L 12/4633; G06F 12/0817; G06F 13/1668; G06F 13/4282
(Continued)

(56) References Cited

U.S. PATENT DOCUMENTS

| 4,872,157 A | 10/1989 | Hemmady et al. |
| 4,872,159 A | 10/1989 | Hemmady et al. |

(Continued)

FOREIGN PATENT DOCUMENTS

| CN | 101447986 A | 6/2009 |
| CN | 103004158 A | 3/2013 |

(Continued)

OTHER PUBLICATIONS

"QFX10000 Switches System Architecture," White Paper, Juniper Networks, Apr. 2015, 15 pp.
(Continued)

*Primary Examiner* — Titus Wong
(74) *Attorney, Agent, or Firm* — Alleman Hall Creasman & Tuttle LLP

(57) ABSTRACT

A new processing architecture is described in which a data processing unit (DPU) is utilized within a device. Unlike conventional compute models that are centered around a central processing unit (CPU), example implementations described herein leverage a DPU that is specially designed and optimized for a data-centric computing model in which the data processing tasks are centered around, and the primary responsibility of, the DPU. For example, various data processing tasks, such as networking, security, and storage, as well as related work acceleration, distribution and scheduling, and other such tasks are the domain of the DPU. The DPU may be viewed as a highly programmable, high-performance input/output (I/O) and data-processing hub designed to aggregate and process network and storage
(Continued)

I/O to and from multiple other components and/or devices. This frees resources of the CPU, if present, for computing-intensive tasks.

20 Claims, 7 Drawing Sheets

Related U.S. Application Data

(60) Provisional application No. 62/559,021, filed on Sep. 15, 2017, provisional application No. 62/530,691, filed on Jul. 10, 2017.

(51) Int. Cl.
| | |
|---|---|
| *G06F 13/16* | (2006.01) |
| *G06F 13/42* | (2006.01) |
| *G06F 12/0817* | (2016.01) |
| *H04L 49/253* | (2022.01) |
| *H04L 49/10* | (2022.01) |
| *G06F 9/54* | (2006.01) |
| *H04L 12/54* | (2022.01) |
| *H04L 45/02* | (2022.01) |
| *G06F 12/0811* | (2016.01) |
| *H04L 12/70* | (2013.01) |

(52) U.S. Cl.
CPC ...... *G06F 13/1668* (2013.01); *G06F 13/4282* (2013.01); *H04L 12/56* (2013.01); *H04L 45/02* (2013.01); *H04L 49/10* (2013.01); *H04L 49/253* (2013.01); *G06F 12/0811* (2013.01); *G06F 2212/1024* (2013.01); *G06F 2212/152* (2013.01); *G06F 2213/0026* (2013.01); *H04L 2012/5619* (2013.01); *H04L 2012/5681* (2013.01)

(58) Field of Classification Search
USPC .......................................................... 710/5
See application file for complete search history.

(56) References Cited

U.S. PATENT DOCUMENTS

| | | | |
|---|---|---|---|
| 5,301,324 | A | 4/1994 | Dewey et al. |
| 5,812,549 | A | 9/1998 | Sethu |
| 5,828,860 | A | 10/1998 | Miyaoku et al. |
| 6,021,473 | A | 2/2000 | Davis et al. |
| 6,055,579 | A | 4/2000 | Goyal et al. |
| 6,314,491 | B1 | 11/2001 | Freerksen et al. |
| 6,647,453 | B1 | 11/2003 | Duncan et al. |
| 6,842,906 | B1 | 1/2005 | Bowman-Amuah |
| 6,901,451 | B1 | 5/2005 | Miyoshi et al. |
| 6,901,500 | B1 | 5/2005 | Hussain |
| 6,993,630 | B1 | 1/2006 | Williams et al. |
| 7,035,914 | B1 | 4/2006 | Payne et al. |
| 7,082,477 | B1 | 7/2006 | Sadhasivam et al. |
| 7,275,103 | B1 | 9/2007 | Thrasher et al. |
| 7,289,964 | B1 | 10/2007 | Bowman-Amuah et al. |
| 7,342,887 | B1 | 3/2008 | Sindhu |
| 7,480,304 | B2 | 1/2009 | Yeh et al. |
| 7,486,678 | B1 | 2/2009 | Devanagondi et al. |
| 7,664,110 | B1 | 2/2010 | Lovett et al. |
| 7,733,781 | B2 | 6/2010 | Petersen |
| 7,822,731 | B1 | 10/2010 | Yu et al. |
| 7,843,907 | B1 | 11/2010 | Abou-Emara et al. |
| 7,965,624 | B2 | 6/2011 | Ripa et al. |
| 7,979,588 | B1* | 7/2011 | Tran ..................... G06F 13/387 709/253 |
| 8,386,540 | B1 | 2/2013 | McAlister et al. |
| 8,560,757 | B2 | 10/2013 | Pangborn et al. |
| 8,582,440 | B2 | 11/2013 | Ofelt et al. |
| 8,599,863 | B2 | 12/2013 | Davis |
| 8,625,427 | B1 | 1/2014 | Terry et al. |
| 8,737,410 | B2 | 5/2014 | Davis et al. |
| 8,798,077 | B2 | 8/2014 | Mehra et al. |
| 8,848,728 | B1 | 9/2014 | Revah et al. |
| 8,850,101 | B2 | 9/2014 | Pangborn et al. |
| 8,850,125 | B2 | 9/2014 | Pangborn et al. |
| 8,918,631 | B1 | 12/2014 | Kumar et al. |
| 8,966,152 | B2 | 2/2015 | Bouchard et al. |
| 9,065,860 | B2 | 6/2015 | Pangborn et al. |
| 9,118,984 | B2 | 8/2015 | DeCusatis et al. |
| 9,154,376 | B2 | 10/2015 | Aziz |
| 9,225,628 | B2 | 12/2015 | Zahavi |
| 9,244,798 | B1* | 1/2016 | Kuila ..................... H04L 69/22 |
| 9,262,225 | B2 | 2/2016 | Davis et al. |
| 9,282,384 | B1 | 3/2016 | Graves |
| 9,288,101 | B1* | 3/2016 | Dalal ................. G06F 13/4068 |
| 9,294,304 | B2 | 3/2016 | Sindhu |
| 9,294,398 | B2 | 5/2016 | DeCusatis et al. |
| 9,369,408 | B1 | 6/2016 | Raghavan et al. |
| 9,405,550 | B2 | 8/2016 | Biran et al. |
| 9,565,114 | B1 | 2/2017 | Kabbani et al. |
| 9,569,366 | B2 | 2/2017 | Pangborn et al. |
| 9,632,936 | B1 | 4/2017 | Zuckerman et al. |
| 9,800,495 | B2 | 10/2017 | Lu |
| 9,853,901 | B2 | 12/2017 | Kampmann et al. |
| 9,866,427 | B2 | 1/2018 | Yadav et al. |
| 9,876,735 | B2 | 1/2018 | Davis et al. |
| 9,946,671 | B1 | 4/2018 | Tawri et al. |
| 10,003,552 | B2 | 6/2018 | Kumar et al. |
| 10,104,171 | B1 | 10/2018 | Savic et al. |
| 10,135,731 | B2 | 11/2018 | Davis et al. |
| 10,140,245 | B2 | 11/2018 | Davis et al. |
| 10,304,154 | B2 | 5/2019 | Appu et al. |
| 10,387,179 | B1 | 8/2019 | Hildebrant et al. |
| 10,425,707 | B2 | 9/2019 | Sindhu et al. |
| 10,540,288 | B2 | 1/2020 | Noureddine et al. |
| 10,565,112 | B2 | 2/2020 | Noureddine et al. |
| 10,637,685 | B2 | 4/2020 | Goel et al. |
| 10,645,187 | B2 | 5/2020 | Goyal et al. |
| 10,659,254 | B2 | 5/2020 | Sindhu et al. |
| 10,686,729 | B2 | 6/2020 | Sindhu et al. |
| 10,725,825 | B2 | 7/2020 | Sindhu et al. |
| 10,761,931 | B2 | 9/2020 | Goyal et al. |
| 10,827,191 | B2 | 11/2020 | Dikshit et al. |
| 10,841,245 | B2 | 11/2020 | Gray et al. |
| 10,929,175 | B2 | 2/2021 | Goyal et al. |
| 10,951,393 | B2 | 3/2021 | Thomas et al. |
| 10,986,425 | B2 | 4/2021 | Sindhu et al. |
| 11,048,634 | B2 | 6/2021 | Noureddine et al. |
| 2002/0015387 | A1 | 2/2002 | Houh |
| 2002/0049859 | A1 | 4/2002 | Bruckert et al. |
| 2002/0075862 | A1 | 6/2002 | Mayes |
| 2002/0094151 | A1 | 7/2002 | Li |
| 2002/0118415 | A1 | 8/2002 | Dasylva et al. |
| 2002/0126634 | A1 | 9/2002 | Mansharamani et al. |
| 2002/0126671 | A1 | 9/2002 | Ellis et al. |
| 2003/0043798 | A1 | 3/2003 | Pugel |
| 2003/0091271 | A1 | 5/2003 | Dragone |
| 2003/0229839 | A1 | 12/2003 | Wang et al. |
| 2004/0010612 | A1 | 1/2004 | Pandya |
| 2004/0210320 | A1 | 10/2004 | Pandya |
| 2004/0236912 | A1 | 11/2004 | Glasco |
| 2005/0166086 | A1 | 7/2005 | Watanabe |
| 2005/0259632 | A1 | 11/2005 | Malpani et al. |
| 2006/0029323 | A1 | 2/2006 | Nikonov et al. |
| 2006/0056406 | A1 | 3/2006 | Bouchard et al. |
| 2006/0059484 | A1* | 3/2006 | Selvaggi ................. G06F 9/544 718/100 |
| 2006/0092976 | A1 | 5/2006 | Lakshman et al. |
| 2006/0112226 | A1 | 5/2006 | Hady et al. |
| 2006/0159103 | A1* | 7/2006 | Jain ..................... G06F 12/0815 370/395.7 |
| 2006/0277421 | A1 | 12/2006 | Balestriere |
| 2007/0073966 | A1 | 3/2007 | Corbin |
| 2007/0172235 | A1 | 7/2007 | Snider et al. |
| 2007/0192545 | A1 | 8/2007 | Gara et al. |
| 2007/0198656 | A1 | 8/2007 | Mazzaferri et al. |
| 2007/0255906 | A1 | 11/2007 | Handgen et al. |
| 2008/0002702 | A1 | 1/2008 | Bajic |

(56) References Cited

U.S. PATENT DOCUMENTS

| | | |
|---|---|---|
| 2008/0138067 A1 | 6/2008 | Beshai |
| 2008/0244231 A1 | 10/2008 | Kunze et al. |
| 2009/0024836 A1 | 1/2009 | Shen et al. |
| 2009/0083263 A1 | 3/2009 | Felch et al. |
| 2009/0135739 A1 | 5/2009 | Hoover et al. |
| 2009/0135832 A1 | 5/2009 | Fan et al. |
| 2009/0228890 A1 | 9/2009 | Vaitovirta et al. |
| 2009/0234987 A1 | 9/2009 | Lee et al. |
| 2009/0285228 A1 | 11/2009 | Bagepalli et al. |
| 2010/0061391 A1 | 3/2010 | Sindhu et al. |
| 2010/0125903 A1 | 5/2010 | Devarajan et al. |
| 2010/0241831 A1* | 9/2010 | Mahadevan .......... G06F 9/4812 712/42 |
| 2010/0293353 A1* | 11/2010 | Sonnier .................. H04L 49/109 711/170 |
| 2010/0318725 A1 | 12/2010 | Kwon |
| 2011/0289179 A1 | 1/2011 | Pekcan et al. |
| 2011/0055827 A1 | 3/2011 | Lin et al. |
| 2011/0113184 A1 | 3/2011 | Chu |
| 2011/0170553 A1 | 7/2011 | Beecroft et al. |
| 2011/0173392 A1 | 7/2011 | Gara et al. |
| 2011/0173514 A1 | 7/2011 | Pope et al. |
| 2011/0202658 A1 | 8/2011 | Okuno et al. |
| 2011/0219145 A1 | 9/2011 | Pope et al. |
| 2011/0222540 A1* | 9/2011 | Mital .................... G06F 15/167 370/392 |
| 2011/0225594 A1 | 9/2011 | Iyengar et al. |
| 2011/0228783 A1 | 9/2011 | Flynn et al. |
| 2011/0238923 A1 | 9/2011 | Hooker et al. |
| 2011/0289180 A1 | 11/2011 | Sonnier et al. |
| 2011/0289279 A1 | 11/2011 | Sonnier et al. |
| 2012/0030431 A1 | 2/2012 | Anderson et al. |
| 2012/0033680 A1 | 2/2012 | Gopinath et al. |
| 2012/0036178 A1 | 2/2012 | Gavini et al. |
| 2012/0076153 A1 | 3/2012 | Manzella et al. |
| 2012/0096211 A1 | 4/2012 | Davis et al. |
| 2012/0176890 A1 | 7/2012 | Balus et al. |
| 2012/0177047 A1 | 7/2012 | Roitshtein |
| 2012/0207165 A1 | 8/2012 | Davis |
| 2012/0254587 A1 | 10/2012 | Biran et al. |
| 2012/0314710 A1 | 12/2012 | Shikano |
| 2013/0003725 A1 | 1/2013 | Hendel et al. |
| 2013/0024875 A1 | 1/2013 | Wang et al. |
| 2013/0028083 A1 | 1/2013 | Yoshida et al. |
| 2013/0088971 A1 | 4/2013 | Anantharam et al. |
| 2013/0145375 A1 | 6/2013 | Kang |
| 2013/0191443 A1 | 7/2013 | Gan et al. |
| 2013/0258912 A1 | 10/2013 | Zimmerman et al. |
| 2013/0330076 A1 | 12/2013 | Liboiron-Ladouceur et al. |
| 2013/0346789 A1 | 12/2013 | Brunel et al. |
| 2014/0023080 A1 | 1/2014 | Zhang et al. |
| 2014/0040909 A1 | 2/2014 | Winser et al. |
| 2014/0044128 A1 | 2/2014 | Suresh et al. |
| 2014/0059537 A1 | 2/2014 | Kamble et al. |
| 2014/0075085 A1 | 3/2014 | Schroder et al. |
| 2014/0115122 A1 | 4/2014 | Yengalasetti et al. |
| 2014/0161450 A1 | 6/2014 | Graves et al. |
| 2014/0181319 A1 | 6/2014 | Chen et al. |
| 2014/0187317 A1 | 7/2014 | Kohler et al. |
| 2014/0258479 A1 | 9/2014 | Tenginakai et al. |
| 2014/0269351 A1 | 9/2014 | Graves et al. |
| 2014/0281243 A1 | 9/2014 | Shalf et al. |
| 2014/0310467 A1 | 10/2014 | Shalf et al. |
| 2014/0359044 A1 | 12/2014 | Davis et al. |
| 2015/0019702 A1 | 1/2015 | Kancherla |
| 2015/0037032 A1 | 2/2015 | Xu et al. |
| 2015/0043330 A1 | 2/2015 | Hu et al. |
| 2015/0117860 A1 | 4/2015 | Braun |
| 2015/0143045 A1 | 5/2015 | Han et al. |
| 2015/0143073 A1 | 5/2015 | Winser et al. |
| 2015/0163171 A1 | 6/2015 | Sindhu et al. |
| 2015/0180603 A1 | 6/2015 | Darling et al. |
| 2015/0186313 A1 | 7/2015 | Sodhi et al. |
| 2015/0222533 A1 | 8/2015 | Birrittella et al. |
| 2015/0242324 A1 | 8/2015 | Novakovic et al. |
| 2015/0244617 A1 | 8/2015 | Nakil et al. |
| 2015/0254182 A1 | 9/2015 | Asher et al. |
| 2015/0256405 A1 | 9/2015 | Janardhanan et al. |
| 2015/0278148 A1 | 10/2015 | Sindhu |
| 2015/0278984 A1 | 10/2015 | Koker et al. |
| 2015/0279465 A1* | 10/2015 | Jokinen .................. G11C 15/00 711/104 |
| 2015/0280939 A1 | 10/2015 | Sindhu |
| 2015/0281128 A1 | 10/2015 | Sindhu |
| 2015/0324205 A1 | 11/2015 | Eisen et al. |
| 2015/0325272 A1 | 11/2015 | Murphy |
| 2015/0334034 A1 | 11/2015 | Smedley et al. |
| 2015/0334202 A1 | 11/2015 | Frydman et al. |
| 2015/0355946 A1 | 12/2015 | Kang |
| 2015/0378776 A1 | 12/2015 | Lippett |
| 2015/0381528 A9 | 12/2015 | Davis et al. |
| 2016/0056911 A1 | 2/2016 | Ye et al. |
| 2016/0062800 A1 | 3/2016 | Stanfill et al. |
| 2016/0085722 A1* | 3/2016 | Verplanken ........ G06F 13/4282 710/313 |
| 2016/0092362 A1 | 3/2016 | Barron et al. |
| 2016/0164625 A1 | 6/2016 | Gronvall et al. |
| 2016/0188344 A1 | 6/2016 | Tamir et al. |
| 2016/0210159 A1 | 7/2016 | Wilson et al. |
| 2016/0239415 A1 | 8/2016 | Davis et al. |
| 2016/0241430 A1 | 8/2016 | Yadav et al. |
| 2016/0337723 A1 | 11/2016 | Graves |
| 2016/0364333 A1 | 12/2016 | Brown et al. |
| 2016/0364334 A1 | 12/2016 | Asaro et al. |
| 2016/0378538 A1 | 12/2016 | Kang |
| 2016/0380885 A1 | 12/2016 | Jani et al. |
| 2017/0005921 A1 | 1/2017 | Liu et al. |
| 2017/0031719 A1 | 2/2017 | Clark et al. |
| 2017/0032011 A1 | 2/2017 | Song et al. |
| 2017/0060615 A1 | 3/2017 | Thakkar et al. |
| 2017/0061566 A1 | 3/2017 | Min et al. |
| 2017/0068639 A1 | 3/2017 | Davis et al. |
| 2017/0083257 A1 | 3/2017 | Jain et al. |
| 2017/0214774 A1 | 7/2017 | Chen et al. |
| 2017/0235581 A1 | 8/2017 | Nickolls et al. |
| 2017/0265220 A1 | 9/2017 | Andreoli-Fang et al. |
| 2017/0286143 A1 | 10/2017 | Wagner et al. |
| 2017/0286157 A1 | 10/2017 | Hasting et al. |
| 2017/0346766 A1 | 11/2017 | Dutta |
| 2018/0011739 A1 | 1/2018 | Pothula et al. |
| 2018/0024771 A1 | 1/2018 | Miller et al. |
| 2018/0026901 A1 | 1/2018 | Sugunadass |
| 2018/0054485 A1 | 2/2018 | Warfield et al. |
| 2018/0095878 A1 | 4/2018 | Katayama |
| 2018/0115494 A1 | 4/2018 | Bhatia et al. |
| 2018/0145746 A1 | 5/2018 | Finkelstein |
| 2018/0152317 A1 | 5/2018 | Chang et al. |
| 2018/0234300 A1 | 8/2018 | Mayya et al. |
| 2018/0239702 A1 | 8/2018 | Farmahini Farahani et al. |
| 2018/0287818 A1 | 10/2018 | Goel et al. |
| 2018/0287965 A1 | 10/2018 | Sindhu et al. |
| 2018/0288505 A1 | 10/2018 | Sindhu et al. |
| 2018/0293168 A1 | 10/2018 | Noureddine et al. |
| 2018/0300928 A1 | 10/2018 | Koker et al. |
| 2018/0307494 A1 | 10/2018 | Ould-Ahmed-Vall et al. |
| 2018/0307535 A1 | 10/2018 | Suzuki et al. |
| 2018/0322386 A1 | 11/2018 | Sridharan et al. |
| 2018/0341494 A1 | 11/2018 | Sood et al. |
| 2018/0357169 A1 | 12/2018 | Lai |
| 2018/0357172 A1 | 12/2018 | Lai |
| 2019/0005176 A1 | 1/2019 | Illikkal et al. |
| 2019/0012278 A1 | 1/2019 | Sindhu et al. |
| 2019/0012350 A1 | 1/2019 | Sindhu et al. |
| 2019/0013965 A1 | 1/2019 | Sindhu et al. |
| 2019/0018806 A1 | 1/2019 | Koufaty et al. |
| 2019/0042292 A1 | 2/2019 | Palermo et al. |
| 2019/0042518 A1 | 2/2019 | Marolia et al. |
| 2019/0095333 A1 | 3/2019 | Heirman et al. |
| 2019/0102311 A1 | 4/2019 | Gupta et al. |
| 2019/0104057 A1 | 4/2019 | Goel et al. |
| 2019/0104206 A1 | 4/2019 | Goel et al. |
| 2019/0104207 A1 | 4/2019 | Goel et al. |
| 2019/0158428 A1 | 5/2019 | Gray et al. |
| 2019/0188079 A1 | 6/2019 | Kohli |

(56) References Cited

U.S. PATENT DOCUMENTS

| | | |
|---|---|---|
| 2019/0243765 A1 | 8/2019 | Sindhu et al. |
| 2019/0363989 A1 | 11/2019 | Shalev et al. |
| 2020/0007405 A1 | 1/2020 | Chitalia et al. |
| 2020/0021664 A1 | 1/2020 | Goyal et al. |
| 2020/0021898 A1 | 1/2020 | Sindhu et al. |
| 2020/0028776 A1 | 1/2020 | Atli et al. |
| 2020/0042479 A1 | 2/2020 | Wang et al. |
| 2020/0067839 A1 | 2/2020 | Iny et al. |
| 2020/0119903 A1 | 4/2020 | Thomas et al. |
| 2020/0133771 A1 | 4/2020 | Goyal et al. |
| 2020/0145680 A1 | 5/2020 | Dikshit et al. |
| 2020/0151101 A1 | 5/2020 | Noureddine et al. |
| 2020/0159568 A1 | 5/2020 | Goyal et al. |
| 2020/0159859 A1 | 5/2020 | Beckman et al. |
| 2020/0169513 A1 | 5/2020 | Goel et al. |
| 2020/0183841 A1 | 6/2020 | Noureddine et al. |
| 2020/0259682 A1 | 8/2020 | Goel et al. |
| 2020/0264914 A1 | 8/2020 | Dasgupta et al. |
| 2020/0280462 A1 | 9/2020 | Sindhu et al. |
| 2020/0314026 A1 | 10/2020 | Sindhu et al. |
| 2020/0356414 A1 | 11/2020 | Sindhu et al. |
| 2021/0117242 A1 | 4/2021 | Van De Groenendaal et al. |
| 2022/0116487 A1 | 4/2022 | Sundar et al. |
| 2022/0279421 A1 | 9/2022 | Sivakumar et al. |
| 2022/0286399 A1 | 9/2022 | McDonnell et al. |

FOREIGN PATENT DOCUMENTS

| | | |
|---|---|---|
| CN | 104052618 A | 9/2014 |
| CN | 104521196 A | 4/2015 |
| CN | 104954247 A | 9/2015 |
| CN | 104954251 A | 9/2015 |
| CN | 105024844 A | 11/2015 |
| CN | 105847148 A | 8/2016 |
| CN | 105900406 A | 8/2016 |
| EP | 1079571 A2 | 2/2001 |
| EP | 1489796 A2 | 12/2004 |
| EP | 1501246 A2 | 1/2005 |
| EP | 2289206 A2 | 3/2011 |
| EP | 2928134 A2 | 10/2015 |
| WO | 2009114554 A2 | 9/2009 |
| WO | 2013184846 A1 | 12/2013 |
| WO | 2014178854 A1 | 11/2014 |
| WO | 2016037262 A1 | 3/2016 |
| WO | 2019014268 A1 | 1/2019 |

OTHER PUBLICATIONS

Adya et al., "Cooperative Task Management without Manual Stack Management," Proceedings of the 2002 Usenix Annual Technical Conference, Jun. 2002, 14 pp.

Al-Fares et al., "Hedera: Dynamic Flow Scheduling for Data Center Networks," NSDI'10 Proceedings of the 7th USENIX Conference on Networked Systems Design and Implementation, Apr. 28-30, 2010, 15 pp.

Alizadeh et al., "CONGA: Distributed Congestion—Aware Load Balancing for Datacenters," SIGCOMM '14 Proceedings of the 2014 ACM Conference on SIGCOMM, Aug. 17-22, 2014, pp. 503-514.

Bakkum et al., "Accelerating SQL Database Operations on a GPU with CUDA," Proceedings of the 3rd Workshop on Genral-Purpose Computation on Graphics Processing Units, Mar. 14, 2010, 10 pp.

Banga et al., "Better operating system features for faster network servers," ACM Sigmetrics Performance Evaluation Review, vol. 26, Issue 3, Dec. 1998, 11 pp.

Barroso et al., "Attack of the killer Microseconds," Communications of the ACM, vol. 60, No. 4, Apr. 2017, 7 pp.

Benson et al., "MicroTE: Fine Grained Traffic Engineering for Data Centers," CoNEXT '11 Proceedings of the Seventh Conference on emerging Networking EXperiments and Technologies Article No. 8, Dec. 6-9, 2011, 12 pp.

Benson et al., "Network Traffic Characteristics of Data Centers in the Wild," IMC '10 Proceedings of the 10th ACM SIGCOMM Conference on Internet Measurement, Nov. 1-30, 2010, pp. 267-280.

Corrected International Search Report and Written Opinion of International Application No. PCT/US2018/041506, dated Sep. 27, 2018, 2 pp.

Deutsch, "Deflate Compressed Data Format Specification version 1.3," IETF Network Working Group, RFC 1951, May 1996, 15 pp.

First Office Action and Search Report, and translation thereof, from counterpart Chinese Agplication No. 201880046048.2, dated May 8, 2021, 26 pp.

Ford et al., "TCP Extensions for Multipath Operation with Multiple Addresses," Internet Engineering Task Force (IETF), RFC 6824, Jan. 2013, 64 pp.

Friedman et al., "Programming with Continuations," Technical Report 151, Nov. 1983, 14 pp.

Gay et al., "The nesC Language: A Holistic Approach to Networked Embedded Systems," accessed from http://nescc.sourceforge.net, last updated Dec. 14, 2004, 11 pp.

Halbwachs et al., "The Synchronous Data Flow Programming Language LUSTRE," Proceedings of the IEEE, vol. 79, No. 9, Sep. 1991, 16 pp.

Haynes et al., "Continuations and Coroutines," Technical Report No. 158, Jun. 1984, 19 pp.

Hewitt, "Viewing Control Structures as Patterns of Passing Messages" Massachusetts Institute of Technology, Artificial Intelligence Laboratory, Dec. 1976, 61 pp.

Hseush et al., Data Path Debugging: Data-Oriented Debugging for a Concurrent Programming Language, PADD '88 Proceedings of the 1988 ACM SIGPLAN and SIGOPS workshop on Parallel and distributed debugging, May 5-6, 1988, 12 pp.

Huang et al., "Erasure Coding in Windows Azure Storage," 2012 USENIX Annual Technical Conference, Jun. 13-15, 2012, 12 pp.

Hurson, "Advances in Computers, vol. 92," Jan. 13, 2014, Academic Press, XP055510879, 94-95 pp.

International Search Report and Written Opinion of International Application No. PCT/US2018/041506, dated Sep. 19, 2018, 13 pp.

Isen et al., "ESKIMO—Energy Savings using Semantic Knowledge of Inconsequential Memory Occupancy for DRAM subsystem," 42nd Annual IEEE/ACM International Symposium on Microarchitecture (MICRO), Dec. 12-16, 2009, 10 pp.

Kahn et al., "Actors as a Special Case of Concurrent Constraint Programming," ECOOP/OOPSLA '90 Proceedings, Oct. 21-25, 1990, 10 pp.

Kaminow, "Optical Integrated Circuits: A Personal Perspective," Journal of Lightwave Technology, vol. 26, No. 9, May 1, 2008, pp. 994-1004.

Kandula et al., "Dynamic Load Balancing Without Packet Reordering," SIGCOMM Computer Communication Review, vol. 37, No. 2, Apr. 2007, pp. 53-62.

Kandula et al., "The Nature of Datacenter Traffic: Measurements & Analysis," IMC '09 Proceedings of the 9th ACM SIGCOMM conference on Internet measurement, Nov. 4-6, 2009, pp. 202-208.

Kelly et al., A Block Diagram Compiler, The Bell System Technical Journal, Dec. 7, 1960, 10 pp.

Kounavis et al., "Programming the data path in network processor-based routers," Software—Practice and Experience, Oct. 21, 2003, 38 pp.

Larus et al., "Using Cohort Scheduling to Enhance Server Performance," Usenix Annual Technical Conference, Jun. 2002, 12 pp.

Levis et al., "Tiny OS: An Operating System for Sensor Networks," Ambient Intelligence, Jan. 2005, 34 pp.

Lin et al., A Parameterized Dataflow Language Extension for Embedded Streaming Systems, 2008 International Conference on Embedded Computer Systems: Architectures, Modeling, and Simulation, Jul. 21-24, 2008, 8 pp.

Mishra et al., "Thread-based vs Event-based Implementation of a Group Communication Service," Proceedings of the First Merged International Parallel Processing Symposium and Symposium on Parallel and Distributed Processing, Mar. 30-Apr. 3, 1998, 5 pp.

Notice of Allowance from U.S. Appl. No. 16/031,676, dated Jan. 13, 2020, 16 pp.

(56) References Cited

OTHER PUBLICATIONS

Office Action from U.S. Appl. No. 16/877,050, dated Apr. 14, 2022, 13 pp.
Prosecution History from U.S. Appl. No. 16/031,921, now U.S. Pat. No. 11,303,472, dated Nov. 18, 2019 through Dec. 14, 2021, 133 pp.
Prosecution History from U.S. Appl. No. 16/031,945, now U.S. Pat. No. 10,725,825, dated Jan. 24, 2020 through Jun. 30, 2020, 40 pp.
Raiciu et al., "Improving Datacenter Performance and Robustness with Multipath TCP," ACM SIGCOMM Computer Communication Review—SIGCOMM '11, vol. 41, No. 4, Aug. 2011, pp. 266-277.
Response to Written Opinion from International Application No. PCT/US2018/041506, filed May 10, 2019, 19 pp.
Schroeder et al., "Flash Reliability in Production: The Expected and the Unexpected," 14th USENIX Conference on File and Storage Technologies (FAST '16), Feb. 22-25, 2016, 15 pp.
Varela et al., "The Salsa Programming Language 2.0.0alpha Release Tutorial," Tensselaer Polytechnic Institute, Nov. 2009, 52 pp.
Von Behren et al., "Why Events Are a Bad Idea (for high-concurrency servers)," Proceedings of HotOS IX, May 2003, 6 pp.
Wang et al., "A Spatial and Temporal Locality-Aware Adaptive Cache Design with Network Optimization for Tiled Many-Core Architectures," IEEE Transactions on Very Large Scale Integration (VLSI) Systems, vol. 25. No. 9, Sep. 2017, pp. 2419-2433.
Welsh et al., "SEDA: An Architecture for Well-Conditioned, Scalable Internet Services," Eighteenth Symposium on Operating Systems Principles, Oct. 21-24, 2001, 14 pp.
Zhu et al., "Congestion Control for Large-Scale RDMA Deployments," SIGCOMM '15 Proceedings of the 2015 ACM Conference on Special Interest Group on Data Communication, Aug. 17-21, 2015, pp. 523-536.
Notice of Allowance from U.S. Appl. No. 16/877,050 dated Sep. 6, 2022, 11 pp.
Office Action from U.S. Appl. No. 16/939,617 dated Dec. 9, 2022, 17 pp.
Response to Office Action dated Apr. 14, 2022 from U.S. Appl. No. 16/877,050 filed filed Jul. 14, 2022, 11 pp.
Response to Office Action dated Dec. 9, 2022 from U.S. Appl. No. 16/939,617, filed Mar. 9, 2023, 6 pp.
"Notice of Allowance Issued in U.S. Appl. No. 16/939,617", dated Apr. 4, 2023, 5 Pages.
"First Office Action Issued in Chinese Patent Application No. 201880046042.5", dated Dec. 26, 2022, 27 Pages.
"Notice of Allowance Issued in Chinese Patent Application No. 201880046042.5", dated May 29, 2023, 4 Pages.
"Notice of Allowance Issued in U.S. Appl. No. 16/939,617", dated Jul. 18, 2023, 5 Pages.

\* cited by examiner

DATA PROCESSING UNIT FOR COMPUTE NODES AND STORAGE NODES

This application is a continuation of U.S. patent application Ser. No. 16/031,921, filed Jul. 10, 2018, which claims the benefit of U.S. Provisional Appl. No. 62/530,691, filed Jul. 10, 2017, and U.S. Provisional Appl. No. 62/559,021, filed Sep. 15, 2017, the entire content of each of which is incorporated herein by reference.

TECHNICAL FIELD

This disclosure relates to devices for processing packets of information, for example, in the fields of networking and storage.

BACKGROUND

Conventional computing devices typically include components such as a central processing unit (CPU), a graphics processing unit (GPU), random access memory, storage, and a network interface card (NIC), such as an Ethernet interface, to connect the computing device to a network. Typical computing devices are processor centric such that overall computing responsibility and control is centralized with the CPU. As such, the CPU performs processing tasks, memory management tasks such as shifting data between local caches within the CPU, the random access memory, and the storage, and networking tasks such as constructing and maintaining networking stacks, and sending and receiving data from external devices or networks. Furthermore, the CPU is also tasked with handling interrupts, e.g., from user interface devices. Demands placed on the CPU have continued to increase over time, although performance improvements in development of new CPUs have decreased over time.

General purpose CPUs are normally not designed for high-capacity network and storage workloads, which are typically packetized. In general, CPUs are relatively poor at performing packet stream processing, because such traffic is fragmented in time and does not cache well. Nevertheless, server devices typically use CPUs to process packet streams.

As one example, CPUs modeled on the x86 architecture encounter inefficiencies in various areas, including interfacing to hardware (e.g., interrupts, completions, doorbells, and other PCI-e communication overhead), software layering (e.g., kernel to user switching cost), locking and synchronization (e.g., overhead of protection of state and serialization of access at various processing steps), buffer management (e.g., the load on CPU and memory of allocating and freeing memory and meta-data, as well as managing and processing buffer lists), packet processing (e.g., costs in interrupts, thread scheduling, managing hardware queues, and maintaining linked lists), protocol processing (e.g., access control lists (ACL), flow lookup, header parsing, state checking, and manipulation for transport protocols), memory systems (e.g., data copy, memory, and CPU bandwidth consumption), and cache effects (e.g., cache pollution due to volume of non-cacheable data).

SUMMARY

In general, this disclosure describes a new processing architecture that utilizes a data processing unit (DPU). Unlike conventional compute models that are centered around a central processing unit (CPU), example implementations described herein leverage a DPU that is specially designed and optimized for a data-centric computing model in which the data processing tasks are centered around, and the primary responsibility of, the DPU. The DPU may be viewed as a highly programmable, high-performance input/output (I/O) and data-processing hub designed to aggregate and process network and storage (e.g., solid state drive (SSD)) I/O to and from multiple other components and/or devices. This frees resources of the CPU, if present, for computing-intensive tasks.

For example, various data processing tasks, such as networking, security, and storage, as well as related work acceleration, distribution and scheduling, and other such tasks are the domain of the DPU. In some cases, an application processor (e.g., a separate processing device, server, storage device or even a local CPU and/or local graphics processing unit (GPU) of the compute node hosting the DPU) may programmatically interface with the DPU to configure the DPU as needed and to offload any data-processing intense tasks. In this manner, an application processor can reduce its processing load, such that the application processor can perform those computing tasks for which the application processor is well suited, and offload data-focused tasks for which the application processor may not be well suited (such as networking, storage, and the like) to the DPU.

As described herein, the DPU may be optimized to perform input and output (I/O) tasks, such as storage and retrieval of data to and from storage devices (such as solid state drives), networking, and the like. For example, the DPU may be configured to execute a large number of data I/O processing tasks relative to a number of instructions that are processed. As various examples, the DPU may be provided as an integrated circuit mounted on a motherboard of a compute node (e.g., computing device or compute appliance) or a storage node, installed on a card connected to the motherboard, such as via a Peripheral Component Interconnect-Express (PCI-e) bus, or the like. Additionally, storage devices (such as SSDs) may be coupled to and managed by the DPU via, for example, the PCI-e bus (e.g., on separate cards). The DPU may support one or more high-speed network interfaces, such as Ethernet ports, without the need for a separate network interface card (NIC), and may include programmable hardware specialized for network traffic.

The DPU may be highly programmable such that the DPU may expose hardware primitives for selecting and programmatically configuring data processing operations, allowing the CPU to offload various data processing tasks to the DPU. The DPU may be optimized for these processing tasks as well. For example, the DPU may include hardware implementations of high-performance data processing tasks, such as cryptography, compression (including decompression), regular expression processing, lookup engines, or the like.

In some cases, the data processing unit may include a coherent cache memory implemented in circuitry, a non-coherent buffer memory implemented in circuitry, and a plurality of processing cores implemented in circuitry, each connected to the coherent cache memory and the non-coherent buffer memory. In other cases, the data processing unit may include two or more processing clusters, each of the processing clusters comprising a coherent cache memory implemented in circuitry, a non-coherent buffer memory implemented in circuitry, and a plurality of processing cores implemented in circuitry, each connected to the coherent cache memory and the non-coherent buffer memory. In either case, each of the processing cores may be programmable using a high-level programming language, e.g., C, C++, or the like.

In one example, this disclosure is directed to a device comprising one or more storage devices, and a data processing unit communicatively coupled to the storage devices. The data processing unit comprises a networking unit configured to control input and output of data between the data processing unit and a network, a plurality of programmable processing cores configured to perform processing tasks on the data, and one or more host units configured to at least one of control input and output of the data between the data processing unit and one or more application processors or control storage of the data with the storage devices.

In another example, this disclosure is direct to a system comprising a rack holding a plurality of devices that each includes one or more storage devices and at least one data processing unit communicatively coupled to the storage devices. The data processing unit comprises a networking unit configured to control input and output of data between the data processing unit and a network, a plurality of programmable processing cores configured to perform processing tasks on the data, and one or more host units configured to at least one of control input and output of the data between the data processing unit and one or more application processors or control storage of the data with the storage devices.

The details of one or more examples are set forth in the accompanying drawings and the description below. Other features, objects, and advantages will be apparent from the description and drawings, and from the claims.

DETAILED DESCRIPTION

Figure 1A:
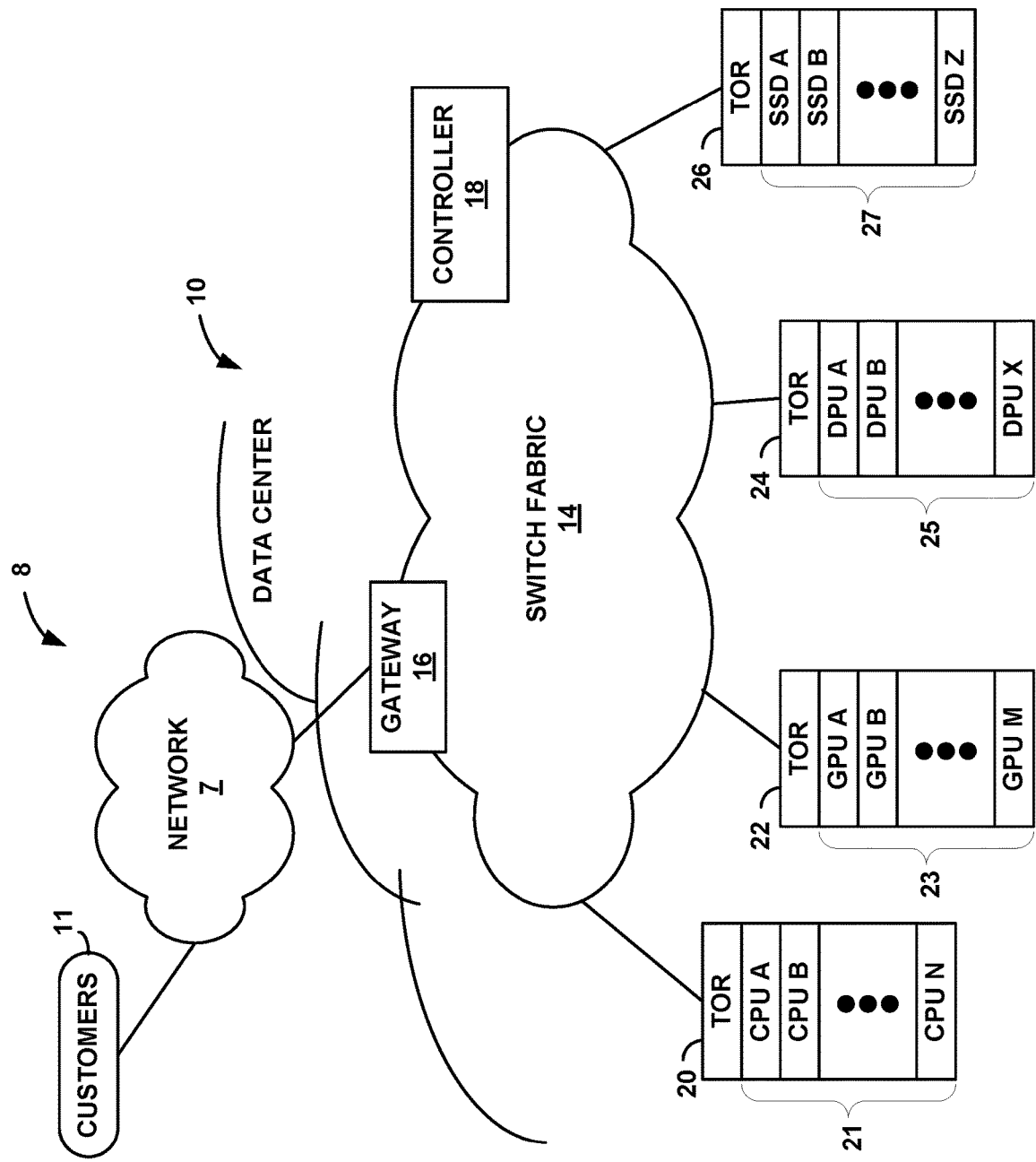
FIGS. 1A-1D are block diagrams illustrating various example implementations of nodes including a data processing unit configured according to the techniques of this disclosure.

FIGS. 1A-1D are block diagrams illustrating example implementations of nodes including a data processing unit configured according to the techniques of this disclosure. In particular, FIG. 1A is a block diagram illustrating an example system 8 having a data center 10 including racks of various nodes, such as compute nodes (e.g., computing devices or compute appliances) and storage nodes, in which one or more of the nodes include a data processing unit configured according to the techniques of this disclosure. In general, data center 10 provides an operating environment for applications and services for customers 11 coupled to data center 10 by network 7 and gateway device 16. In some examples, network 7 may be a content/service provider network. In other examples, network 7 may be a data center wide-area network (DC WAN), private network or other type of network. Data center 10 may, for example, host infrastructure equipment, such as compute nodes, networking and storage systems, redundant power supplies, and environmental controls. Network 7 may be coupled to one or more networks administered by other providers and may thus form part of a large-scale public network infrastructure, e.g., the Internet.

In some examples, data center 10 may represent one of many geographically distributed network data centers. In the example of FIG. 1A, data center 10 is a facility that provides information services for customers 11. Customers 11 may be collective entities such as enterprises and governments, or individuals. For example, a network data center may host web services for several enterprises and end users. Other exemplary services may include data storage, virtual private networks, file storage services, data mining services, scientific- or super-computing services, and so on.

This disclosure describes a new processing architecture in which a data processing unit (DPU) is utilized within one or more nodes. Unlike conventional compute models that are centered around a central processing unit (CPU), example implementations described herein leverage a DPU that is specially designed and optimized for a data-centric computing model in which the data processing tasks are centered around, and the primary responsibility of the DPU. The DPU may be viewed as a highly programmable, high-performance input/output (I/O) and data-processing hub designed to aggregate and process network and storage (e.g., solid state drive (SSD)) I/O to and from multiple other components and/or devices.

In the illustrated example of FIG. 1A, data center 10 includes a number of racks hosting various types of devices that provide an operational environment for hosting cloud services. In this example, data center 10 includes a central processing unit (CPU) rack 20, a graphics processing unit (GPU) rack 22, a data processing unit (DPU) rack 24, and a solid state drive (SSD) storage device rack 26. Although only one rack of each type is illustrated in FIG. 1A, it is understood that in other examples data center 10 may include a set, i.e., two or more, of each type of rack.

In accordance with the techniques described in this disclosure, one or more of the devices held in CPU rack 20, GPU rack 22, and/or DPU rack 24 may include DPUs. These DPUs, for example, may be responsible for various data processing tasks, such as networking, security, and storage, as well as related work acceleration, distribution and scheduling, and other such tasks. In some cases, the DPUs may be used in conjunction with application processors to offload any data-processing intensive tasks and free the application processors for computing-intensive tasks. In other cases, where control plane tasks are relatively minor compared to the data-processing intensive tasks, the DPUs may take the place of the application processors.

For example, as further explained below, CPU rack 20 hosts a number of CPU blades 21 or other compute nodes that are designed for providing a high-speed execution environment. That is, each CPU blade may contain a number of multi-core processors specially tailored to provide high-performance application execution. Similarly, GPU rack 22 may host a number of GPU blades 23 or other compute nodes that are designed to operate under the direction of a CPU or a DPU for performing complex mathematical and graphical operations better suited for GPUs. SSD rack 26 may host a number of SSD blades 27 or other storage nodes that contain permanent storage devices designed for storage and retrieval of data.

In general, in accordance with the techniques described herein, various compute nodes within data center 10, such as any of CPU blades 21, GPU blades 23, and DPU blades 25, may include DPUs to perform data centric tasks within data center 10. In addition, various storage nodes within data center 10, such as any of SSD blades 27, may interact with DPUs within CPU blades 21, GPU blades 23, or DPU blades 25 to store data for the data centric tasks performed by the DPUs. As described herein, the DPU is optimized to perform input and output (I/O) tasks, such as storage and retrieval of data to and from storage devices (such as SSDs), networking, and the like. For example, the DPU may be configured to execute a large number of data I/O processing tasks relative to a number of instructions that are processed. The DPU may support one or more high-speed network interfaces, such as Ethernet ports, without the need for a separate network interface card (NIC), and may include programmable hardware specialized for network traffic. The DPU may be highly programmable such that the DPU may expose hardware primitives for selecting and programmatically configuring data processing operations. The DPU may be optimized for these processing tasks as well. For example, the DPU may include hardware implementations of high-performance data processing tasks, such as cryptography, compression (and decompression), regular expression processing, lookup engines, or the like.

In the example shown in FIG. 1A, the set of racks 20, 22, 24, and 26 are connected to a high-speed switch fabric 14 via Ethernet links. Each of the racks holds a plurality of devices that may be interconnected within their respective racks via Peripheral Component Interconnect-Express (PCI-e) links and/or Ethernet links. In addition, the devices included in the different racks 20, 22, 24, and 26 may be interconnected via PCI-e links and/or Ethernet links. In some examples, each of racks 20, 22, 24, and 26 may be a physical equipment rack having forty rack units (e.g., slots) in which to hold devices. In other examples, each of racks 20, 22, 24, and 26 may be logical racks or half-physical racks having twenty rack units. Each of the devices may be implemented as single- or multi-rack unit (RU) devices.

One or more of the devices in the different racks 20, 22, 24, or 26 may be configured to operate as storage systems and application servers for data center 10. For example, CPU rack 20 holds a plurality of CPU blades ("CPUs A-N") 21 that each includes at least a CPU. One or more of CPU blades 21 may include a CPU, a DPU, and one or more storage devices, e.g., SSDs, communicatively coupled via PCI-e links or buses. In this implementation, the DPU is configured to retrieve data from the storage devices on behalf of the CPU, store data to the storage devices on behalf of the CPU, and retrieve data from network 7 on behalf of the CPU. One or more of CPU blades 21 may also include a GPU communicatively coupled to at least the DPU. In this case, the DPU is also configured to send offloaded processing tasks (e.g., graphics intensive processing tasks, or other tasks that may benefit from the highly parallel processing nature of a graphics processing unit) to the GPU. An example implementation of one of CPU blades 21 is described in more detail below with respect to compute node 100A of FIG. 1B.

In some examples, at least some of CPU blades 21 may not include their own DPUs, but instead are communicatively coupled to a DPU on another one of CPU blades 21. In other words, one DPU may be configured to control I/O and other data processing tasks for two or more CPUs on different ones of CPU blades 21. In still other examples, at least some of CPU blades 21 may not include their own DPUs, but instead are communicatively coupled to a DPU on one of DPU blades 25 held in DPU rack 24. In this way, the DPU may be viewed as a building block for building and scaling out data centers, such as data center 10.

As another example, GPU rack 22 holds a plurality of GPU blades ("GPUs A-M") 23 that each includes at least a GPU. One or more of GPU blades 23 may include a GPU, a DPU, and one or more storage devices, e.g., SSDs, communicatively coupled via PCI-e links or buses. In this implementation, the DPU is configured to control input and output of data with network 7, feed the data from at least one of network 7 or the storage devices to the GPU for processing, and control storage of the data with the storage devices. An example implementation of one of GPU blades 23 is described in more detail below with respect to compute node 100B of FIG. 1C.

In some examples, at least some of GPU blades 23 may not include their own DPUs, but instead are communicatively coupled to a DPU on another one of GPU blades 23. In other words, one DPU may be configured to control I/O tasks to feed data to two or more GPUs on different ones of GPU blades 23. In still other examples, at least some of GPU blades 23 may not include their own DPUs, but instead are communicatively coupled to a DPU on one of DPU blades 25 held in DPU rack 24.

As a further example, DPU rack 24 holds a plurality of DPU blades ("DPUs A-X") 25 that each includes at least a DPU. One or more of DPU blades 25 may include a DPU and one or more storage devices, e.g., SSDs, communicatively coupled via PCI-e links or buses such that DPU blades 25 may alternatively be referred to as "storage blades." In this implementation, the DPU is configured to control input and output of data with network 7, perform programmable processing tasks on the data, and control storage of the data with the storage devices. An example implementation of one of DPU blades 25 is described in more detail below with respect to compute node 101 of FIG. 1D.

As illustrated in FIG. 1A, data center 10 may also include at least one separate, stand-alone, SSD rack 26 that holds a plurality of SSD blades ("SSDs A-Z") 27 that each includes at least one SSD device. The majority of SSD blades 27 do not include their own processors, e.g., no CPUs or DPUs are included on most of SSD blades 27. Instead, in one example, one of SSD blades 27 may include one or more DPUs that are communicatively coupled to each of the plurality of other SSD blades 27. In other examples, SSD rack 26 may include a DPU blade that includes one or more DPUs that are communicatively coupled to each of the plurality of SSD blades 27, or one or more DPUs on DPU blades 25 held in DPU rack 24 may be communicatively coupled to the plurality of SSD blades 27 held in SSD rack 26. In any implementation, the DPUs are configured to control input and output of data with network 7, perform programmable processing tasks on the data, and control storage of the data with the SSDs on SSD blades 27. In this way, the scalability of storage is not tied to the scalability of processing in data center 10. Although illustrated in FIG. 1A as only including SSDs as storage devices for data center 10, in other examples, data center 10 may include one or more racks holding hard drive (HD) storage devices or a combination of SSD and HD storage devices.

In general, DPUs may be included on or communicatively coupled to any of CPU blades 21, GPU blades 23, DPU blades 25, and/or SSD blades 27 to provide computation services and storage facilities for applications and data associated with customers 11. In this way, the DPU may be viewed as a building block for building and scaling out data centers, such as data center 10.

In the illustrated example of FIG. 1A, each of racks 20, 22, 24, and 26 may include a top of rack (TOR) device through which each of the blades held in the physical rack may connect to switch fabric 14 via Ethernet links. In other examples, one or more of the physical racks may not include a TOR device and may instead connect directly to switch fabric 14 or connect to switch fabric 14 via another device that is not held in the physical rack itself. For example, DPU rack 24 may not include the illustrated TOR device, and instead each of the DPUs in DPU blades 25 may support a network interface through which to connect to switch fabric 14 directly via Ethernet links.

The DPUs or any of the devices within racks 20, 22, 24, and 26 that include at least one DPU may also be referred to as access nodes. In other words, the term DPU may be used herein interchangeably with the term access node. As access nodes, the DPUs may utilize switch fabric 14 to provide full mesh (any-to-any) interconnectivity such that any of the devices in racks 20, 22, 24, 26 may communicate packet data for a given packet flow to any other of the devices using any of a number of parallel data paths within the data center 10. For example, the DPUs may be configured to spray individual packets for packet flows between the DPUs and across some or all of the multiple parallel data paths in the data center switch fabric 14 and reorder the packets for delivery to the destinations so as to provide full mesh connectivity.

Although racks 20, 22, 24, and 26 are described in FIG. 1 with respect to switch fabric 14 of data center 10, in other examples, the DPUs of the devices within racks 20, 22, 24, 26 may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the DPUs. The packet switched network may use any technology, including IP over Ethernet as well as other technologies. Irrespective of the type of packet switched network, the DPUs may spray individual packets for packet flows between the DPUs and across multiple parallel data paths in the packet switched network and reorder the packets for delivery to the destinations so as to provide full mesh connectivity.

Additional example details of various example access nodes are described in U.S. Provisional Patent Application No. 62/559,021, filed Sep. 15, 2017, entitled "Access Node for Data Centers," the entire content of which is incorporated herein by reference. More details on data center network architectures and interconnected access nodes are available in U.S. patent application Ser. No. 15/939,227, filed Mar. 28, 2018, entitled "Non-Blocking Any-to-Any Data Center Network with Packet Spraying Over Multiple Alternate Data Paths," the entire content of which is incorporated herein by reference.

A new data transmission protocol referred to as a Fabric Control Protocol (FCP) may be used by the different operational networking components of any of the DPUs of the devices within racks 20, 22, 24, 26 to facilitate communication of data across switch fabric 14. FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. More details on the FCP are available in U.S. Provisional Patent Application No. 62/566,060, filed Sep. 29, 2017, entitled "Fabric Control Protocol for Data Center Networks with Packet Spraying Over Multiple Alternate Data Paths," the entire content of which is incorporated herein by reference.

In the example of FIG. 1A, a software-defined networking (SDN) controller 18 provides a high-level controller for configuring and managing the routing and switching infrastructure of data center 10. SDN controller 18 provides a logically and in some cases physically centralized controller for facilitating operation of one or more virtual networks within data center 10 in accordance with one or more embodiments of this disclosure. In some examples, SDN controller 18 may operate in response to configuration input received from a network administrator.

In some examples, SDN controller 18 operates to configure the DPUs of the devices within racks 20, 22, 24, 26 to logically establish one or more virtual fabrics as overlay networks dynamically configured on top of the physical underlay network provided by switch fabric 14. For example, SDN controller 18 may learn and maintain knowledge of the DPUs and establish a communication control channel with each of the DPUs. SDN controller 18 uses its knowledge of the DPUs to define multiple sets (groups) of two of more DPUs to establish different virtual fabrics over switch fabric 14. More specifically, SDN controller 18 may use the communication control channels to notify each of the DPUs for a given set which other DPUs are included in the same set. In response, the DPUs dynamically setup FCP tunnels with the other DPUs included in the same set as a virtual fabric over switch fabric 14. In this way, SDN controller 18 defines the sets of DPUs for each of the virtual fabrics, and the DPUs are responsible for establishing the virtual fabrics. As such, underlay components of switch fabric 14 may be unware of virtual fabrics. In these examples, the DPUs interface with and utilize switch fabric 14 so as to provide full mesh (any-to-any) interconnectivity between DPUs of any given virtual fabric. In this way, the devices within racks 20, 22, 24, 26 connected to any of the DPUs forming a given one of virtual fabrics may communicate packet data for a given packet flow to any other of the devices within racks 20, 22, 24, 26 coupled to the DPUs for that virtual fabric using any of a number of parallel data paths within switch fabric 14 that interconnect the DPUs of that virtual fabric. More details of DPUs or access nodes operating to spray packets within and across virtual overlay networks are available in U.S. Provisional Patent Application No. 62/638,788, filed Mar. 5, 2018, entitled "Network Access Node Virtual Fabrics Configured Dynamically over an Underlay Network," the entire content of which is incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Figure 1B:
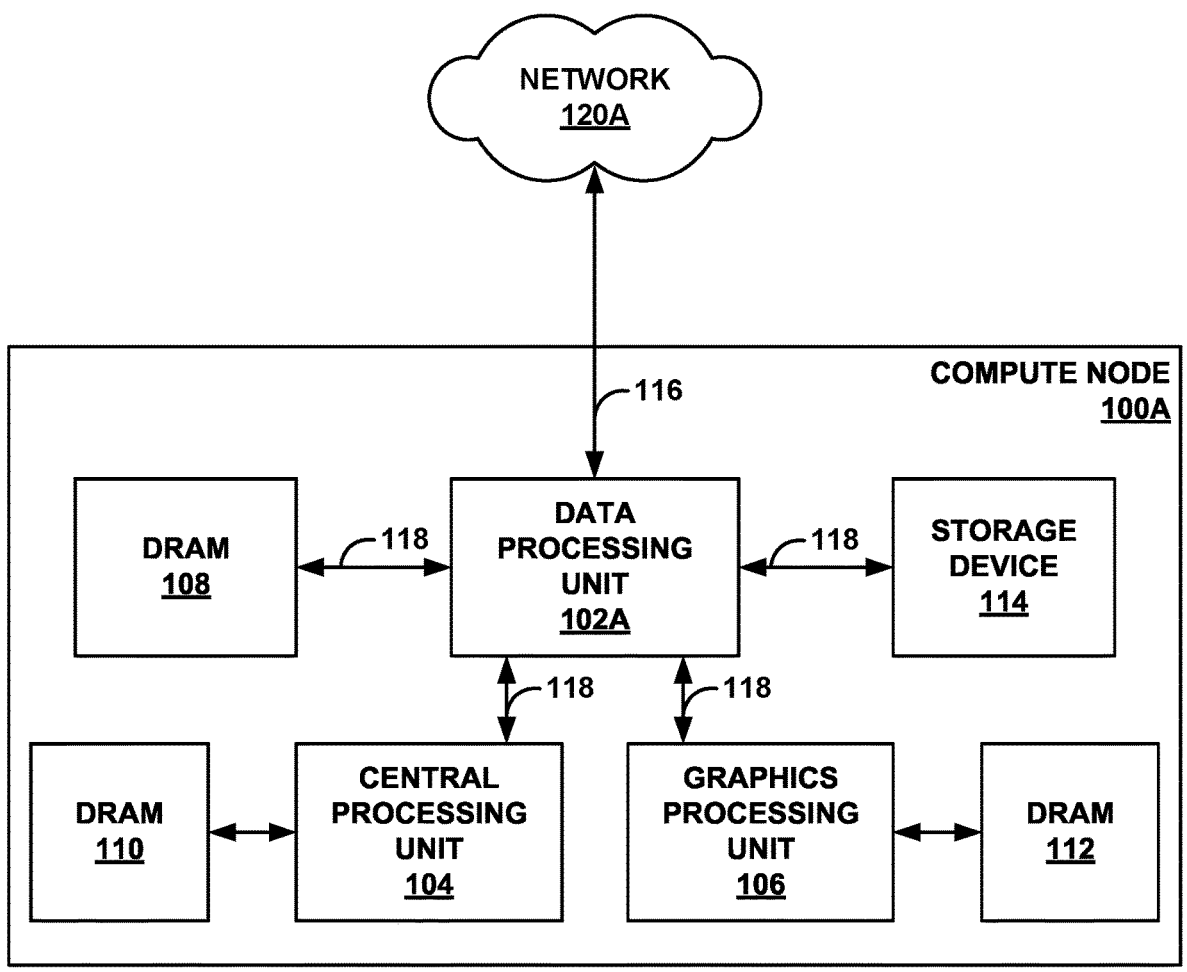

FIG. 1B is a block diagram illustrating an example compute node 100A (e.g., a computing device or compute appliance) including a data processing unit 102A configured according to the techniques of this disclosure and communicatively coupled to a central processing unit 104. As illustrated in FIG. 1B, compute node 100A embodies a new data-centric processing architecture in which data processing tasks and resources are centered around, and the responsibility of, data processing unit (DPU) 102A rather than a central processing unit, as in conventional architectures. Compute node 100A may represent a workstation computer, a server device, or the like. Compute node 100A may represent a server device of a plurality of server devices forming a data center. For example, compute node 100A may include at least one CPU, at least one DPU, at least one GPU, and at least one storage device, e.g., SSD. As another example, with respect to FIG. 1A, compute node 100A may represent at least one of CPU blades 21, or a combination of at least one of CPU blades 21, at least one of GPU blades 23, and at least one of DPU blades 25 of FIG. 1A that are communicatively coupled together.

In the example of FIG. 1B, compute node 100A includes data processing unit (DPU) 102A, central processing unit (CPU) 104, graphics processing unit (GPU) 106, dynamic random access memory (DRAM) 108, 110, 112, and storage device 114, such as SSDs, Flash drives, disk drives, and the like. DPU 102A is coupled to CPU 104, GPU 106, DRAM 108, and storage device 114 via Peripheral Component Interconnect-Express (PCI-e) buses 118 in this example. DPU 102A also acts as a network interface for compute node 100A to network 120A, which may represent the Internet. Network 120A may be substantially similar to network 7 from FIG. 1A. DPU 102A is coupled to a device (e.g., a provider edge router of network 120A, not shown) to access network 120A via Ethernet link 116, in this example. In this manner, DPU 102A is positioned between and communicatively coupled to CPU 104, storage device 114, and GPU 106. Although only one storage device 114 is shown, it should be understood that multiple such storage devices may be included within or coupled to compute node 100A (and DPU 102A may be coupled to each of the storage devices, e.g., via PCI-e buses).

DPU 102A may be configured according to the various techniques of this disclosure. In general, DPU 102A is a high-performance input/output (I/O) hub designed to aggregate and process network and storage (e.g., SSD) I/O to and from multiple other components and/or devices. For example, DPU 102A may be configured to execute a large number of data I/O processing tasks relative to a number of instructions that are processed. In other words, the ratio of I/O tasks that are processed by DPU 102A to a number of instructions that are executed by DPU 102A is high such that DPU 102A comprises a processor that is very I/O intense.

In the example of FIG. 1B, DPU 102A provides access between network 120A, storage device 114, GPU 106, and CPU 104. In other examples, such as in FIGS. 2 and 3 as discussed in greater detail below, a DPU such as DPU 102A may aggregate and process network and SSD I/O to multiple server devices. In this manner, DPU 102A is configured to retrieve data from storage device 114 on behalf of CPU 104, store data to storage device 114 on behalf of CPU 104, and retrieve data from network 120A on behalf of CPU 104. Furthermore, DPU 102A is also configured to send offloaded processing tasks (e.g., graphics intensive processing tasks, or other tasks that may benefit from the highly parallel processing nature of a graphics processing unit) to GPU 106, to receive output for the offloaded processing tasks from GPU 106, and to provide the output for the offloaded processing tasks to CPU 104.

As further described herein, in various examples DPU 102A is a highly programmable I/O processor, with a plurality of processing cores (as discussed below, e.g., with respect to FIG. 2). In some examples, the plurality of processing cores of DPU 102A may be arranged within a number of processing clusters (as discussed below, e.g., with respect to FIG. 3), each equipped with hardware engines that allow CPU 104 to offload various processes, such as cryptographic functions, compression, and regular expression (RegEx) processing. This allows DPU 102A to fully process the network and storage stacks, as well as to serve as a security gateway, freeing up CPU 104 to address application workloads.

As a network interface subsystem, DPU 102A may implement full offload with minimum/zero copy and storage acceleration for compute node 100A. DPU 102A can thus form a nexus between various components and devices, e.g., CPU 104, storage device 114, GPU 106, and network devices of network 120A. For example, DPU 102A may support a network interface to connect directly to network 120A via Ethernet link 116 without a separate network interface card (NIC), as needed between a CPU and a network in conventional architectures.

In general, software programs executable on CPU 104 can perform instructions to offload some or all data-intensive processing tasks associated with the software program to DPU 102A. As noted above, DPU 102A includes processing cores that can be programmed (i.e., can execute software code), as well as specific hardware units configured specifically to implement various data-intensive operations, such as compression, cryptographic functions, and regular expression processing and application to data sets.

Each of the processing cores of DPU 102A may be programmable using a high-level programming language, e.g., C, C++, or the like. In general, the various hardware implementations of processes provided by DPU 102A may be associated with software libraries in the high-level programming language that may be utilized to construct software applications for execution by CPU 104 that, by way of the interfaces, invoke and leverage the functionality of DPU 102A. Thus, a programmer can write a software program in the programming language and use function or procedure calls associated with the hardware implementations of various processes of DPU 102A to perform these functions, and when CPU 104 executes the software program, CPU 104 offloads performance of these functions/procedures to DPU 102A.

Additionally, or alternatively, CPU 104 may offload other software procedures or functions to DPU 102A, to be executed by processing cores of DPU 102A. Furthermore, CPU 104 may offload software procedures or functions to GPU 106 via DPU 102A (e.g., computer graphics processes). In this manner, DPU 102A represents a dynamically programmable processing unit that can execute software instructions, as well as provide hardware implementations of various procedures or functions for data-processing tasks, which may improve performance of these procedures or functions.

Figure 1C:
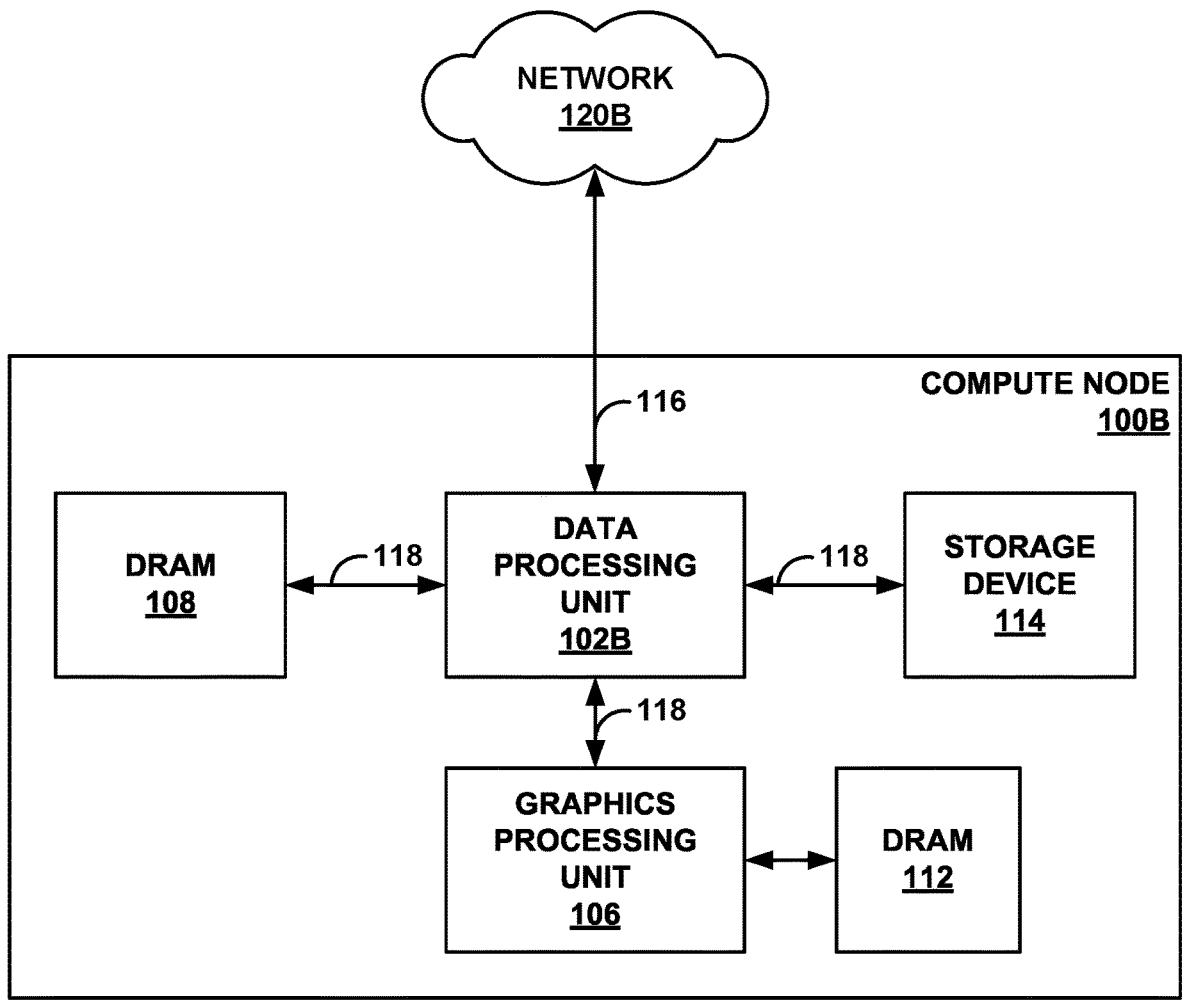

FIG. 1C is a block diagram illustrating an example compute node 100B (e.g., computing device or compute appliance) including a data processing unit 102B configured according to the techniques of this disclosure and communicatively coupled to a graphics processing unit 106. Compute node 100B embodies a new data-centric processing architecture in which DPU 102B, rather than a central processing unit, is responsible for control tasks and I/O processing tasks to facilitate data processing by GPU 106. Compute node 100B may represent a workstation computer, a server device, or the like. Compute node 100B may represent a server device of a plurality of server devices forming a data center. For example, compute node 100B may include at least one DPU, at least one GPU, and at least one storage device, e.g., SSD. As another example, with respect to FIG. 1A, compute node 100B may represent at least one of GPU blades 23, or a combination of at least one of GPU blades 23 and at least one of DPU blades 25 that are communicatively coupled together.

In the example of FIG. 1C, compute node 100B includes DPU 102B, GPU 106, DRAM 108, 112, and storage device 114, such as SSDs, Flash drives, disk drives, and the like. DPU 102B is coupled to GPU 106, DRAM 108, and storage device 114 via PCI-e buses 118 in this example. DPU 102B also acts as a network interface for compute node 100B to network 120B, which may represent the Internet. Network 120B may be substantially similar to network 7 from FIG. 1A. DPU 102B is coupled to a device (e.g., a provider edge router of network 120B, not shown) to access network 120B via Ethernet link 116, in this example. In this manner, DPU 102B is positioned between and communicatively coupled to storage device 114 and GPU 106. Although only one storage device 114 is shown, it should be understood that multiple such storage devices may be included within or coupled to compute node 100B (and DPU 102B may be coupled to each of the storage devices, e.g., via PCI-e buses).

DPU 102B may be configured according to the various techniques of this disclosure. DPU 102B may operate substantially similar to DPU 102A described above with respect to FIG. 1B. In general, DPU 102B is a high-performance I/O hub designed to aggregate and process network and storage (e.g., SSD) I/O to and from multiple other components and/or devices. DPU 102B is a highly programmable I/O processor, with a plurality of processing cores, which may be arranged within a number of processing clusters (as discussed below, e.g., with respect to FIGS. 2 and 3), as well as specific hardware units configured specifically to implement various data-intensive operations. DPU 102B is also a network interface subsystem that can form a nexus between various components and devices, e.g., storage device 114, GPU 106, and network devices of network 120B.

In the example of FIG. 1C, DPU 102B provides access between network 120B, storage device 114, and GPU 106. In other examples, such as in FIGS. 2 and 3 as discussed in greater detail below, a DPU such as DPU 102B may aggregate and process network and SSD I/O to multiple server devices. DPU 102B may operate as a control plane (e.g., essentially a central processing unit) for compute node 100B to facilitate data processing by GPU 106. In this manner, DPU 102B is configured to control input and output of data with network 120B. Furthermore, DPU 102B is also configured to feed data from at least one of network 120B or storage device 114 to GPU 106 for processing (e.g., graphics intensive processing, or other processing tasks that may benefit from the highly parallel processing nature of a graphics processing unit), and receive output of the processing from GPU 106. DPU 102B is further configured to control storage of data that is received from network 120B and/or processed by either DPU 120B or GPU 106 with storage device 114.

As an example, in the case of artificial intelligence (AI) processing, control plane functions include executing control tasks to instruct a GPU to perform certain types of computationally intensive processing, and executing I/O tasks to feed a large amount of data to the GPU for processing. In general, I/O processing tasks that control data movement between GPUs and storage devices are more important for facilitating AI processing than the relatively minor control tasks. Therefore, in the example of AI processing, it makes sense to use DPU 102B in place of a CPU. In the example of FIG. 1C, DPU 102B instructs GPU 106 to perform matrix/linear algebra on data from network 120B or storage device 114, and feeds data to and from GPU 106.

Figure 1D:
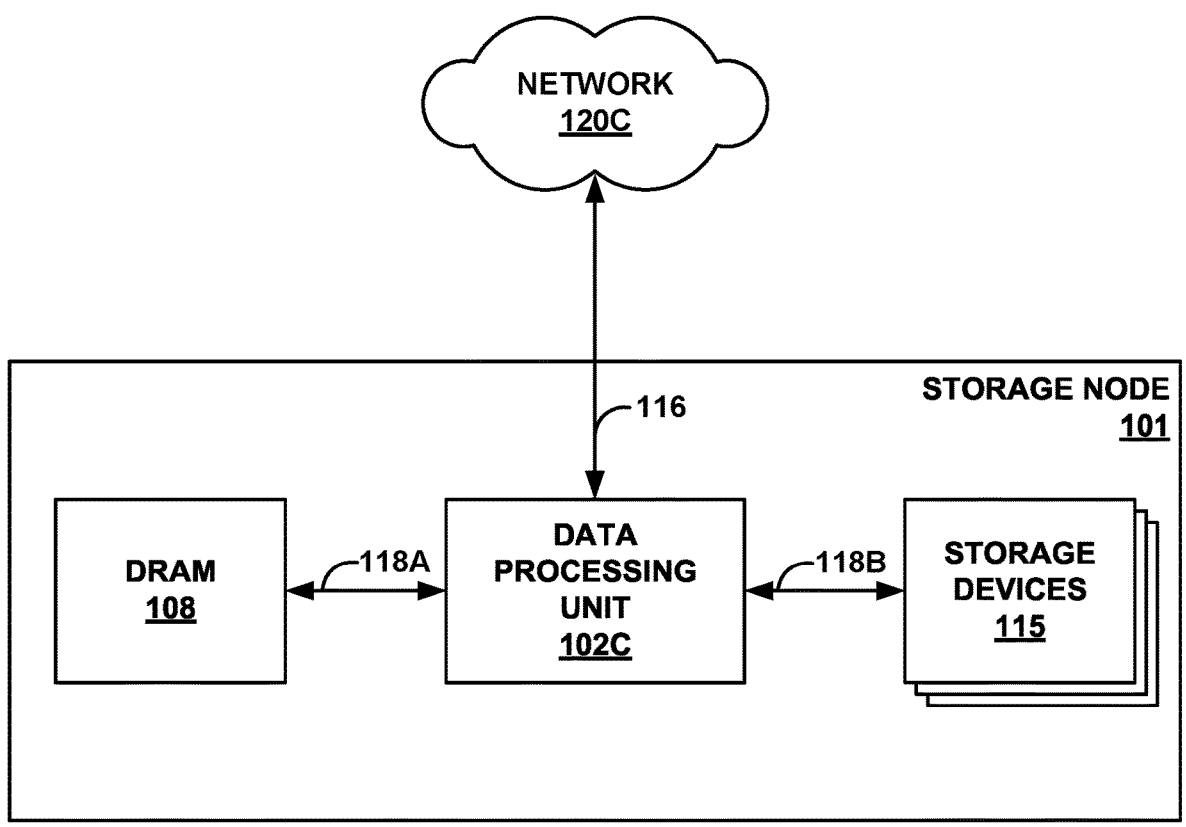

FIG. 1D is a block diagram illustrating an example storage node 101 including a data processing unit 102C configured according to the techniques of this disclosure and communicatively coupled to one or more storage devices 115, such as SSDs, Flash drives, disk drives, and the like. In this example, storage node 101 may represent a storage appliance, a storage server, or a storage controller, and may be coupled to a set, rack, or cluster of storage devices 115, which may be internal or external to storage node 101, or combinations thereof. In this application, DPU 102C provides high-performance processing of streams of packets read from and written to storage devices 115, and provides a direct network interface to network 120C for those streams of packets. As such, DPU 102C may be viewed as a specialized frontend for network accessible storage devices 115 that provides an enhanced execution environment for stream processing of the data read from and written to storage devices 115 from compute nodes, other storage nodes, or other devices coupled to network 120C.

As shown, in this example, storage node 101 may include at least one DPU and at least one storage device, e.g., SSD. As another example, with respect to FIG. 1A, storage node 101 may represent at least one of DPU blades 25, or a combination of at least one of DPU blades 25 and one or more SSD blades 27 or other storage devices that are communicatively coupled together.

In the example of FIG. 1D, storage node 101 includes DPU 102C, DRAM 108, and a plurality of storage device 115. DPU 102C is coupled to DRAM 108 and storage devices 115 via PCI-e buses 118A, 118B in this example. PCI-e interface 118B may, in some examples, be processed by one or more intermediate components to translate the PCI-e interface into other storage protocols, such as SAS or SATA (Serial AT Attachment), as examples. DPU 102C also acts as a network interface for storage node 101 to network 120C, which may represent the Internet. Network 120C may be substantially similar to network 7 from FIG. 1A. DPU 102C may be coupled to a device (e.g., a provider edge router of network 120C, not shown) to access network 120C via Ethernet link 116, in this example.

DPU 102C may be configured according to the various techniques of this disclosure. DPU 102C may operate substantially similar to DPU 102A of FIG. 1B or DPU 102B of FIG. 1C. In general, DPU 102C is a high-performance I/O hub designed to aggregate and process network and storage (e.g., SSD) I/O to and from multiple other components and/or devices. DPU 102C is a highly programmable I/O processor, with a plurality of processing cores, which may be arranged within a number of processing clusters (as discussed below, e.g., with respect to FIGS. 2 and 3), as well as specific hardware units configured specifically to implement various data-intensive operations. DPU 102C is also a network interface subsystem that can form a nexus between various components and devices, e.g., storage devices 115 and network devices of network 120C.

In the example of FIG. 1D, DPU 102C provides access between network 120C and storage devices 115. In other examples, such as in FIGS. 2 and 3 as discussed in greater detail below, a DPU such as DPU 102C may aggregate and process network and SSD I/O to multiple server devices. DPU 102C may operate as a control plane (e.g., essentially a central processing unit) for storage node 101 to facilitate data storage and retrieval from storage devices 115. In this manner, DPU 102C is configured to control input and output of data with network 120C. Furthermore, DPU 102C is also configured to perform programmable processing tasks on data that is received from network 120C or retrieved from storage devices 115. DPU 102C is further configured to control storage of data that is received from network 120C and/or processed by DPU 120C with storage devices 115. In one example, storage devices 115 may comprise an entire rack of SSD blades that each include at least one SSD device, e.g., SSD rack 26 of FIG. 1A. In this example, the I/O processing tasks to control data movement between the network and the SSDs are more important than the relatively minor control tasks associated with data storage. Therefore, in the example of storage management, it makes sense to use DPU 102C in place of a CPU.

Figure 2:
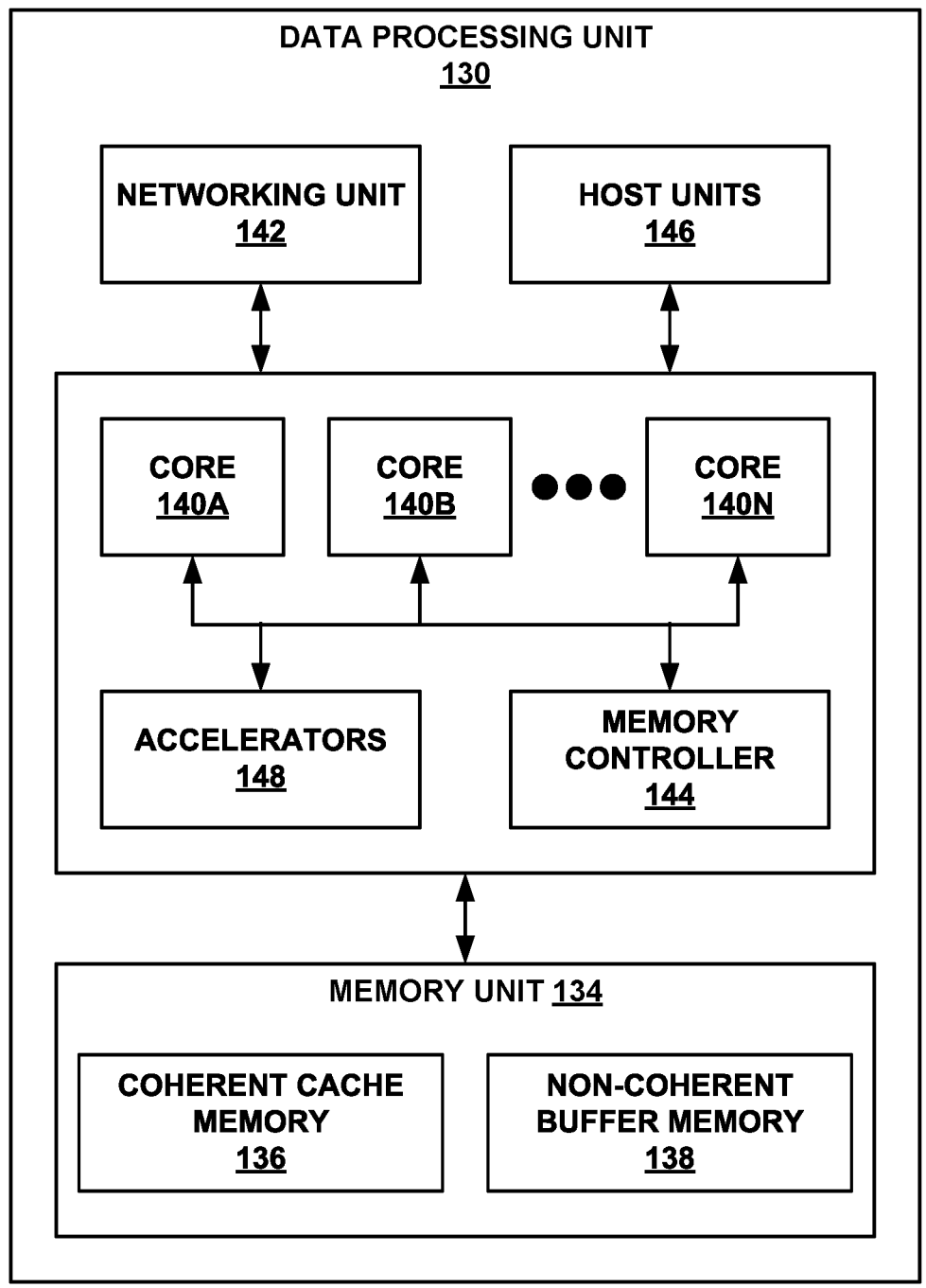
FIG. 2 is a block diagram illustrating an example data processing unit, in accordance with the techniques of this disclosure.

FIG. 2 is a block diagram illustrating an example data processing unit 130 in accordance with the techniques of this disclosure. DPU 130 generally represents a hardware chip implemented in digital logic circuitry. DPU 130 may operate substantially similar to any of the DPUs of the devices within racks 20, 22, 24, or 26 of FIG. 1A, DPU 102A of FIG. 1B, DPU 102B of FIG. 1C, or DPU 102C of FIG. 1D. Thus, DPU 130 may be communicatively coupled to a CPU, a GPU, one or more network devices, server devices, random access memory, storage media (e.g., solid state drives (SSDs)), a data center fabric, or the like, e.g., via PCI-e, Ethernet (wired or wireless), or other such communication media.

In the illustrated example of FIG. 2, DPU 130 includes a plurality of programmable processing cores 140A-140N ("cores 140") and a memory unit 134. Memory unit 134 may include two types of memory or memory devices, namely coherent cache memory 136 and non-coherent buffer memory 138. In some examples, plurality of cores 140 may include at least two processing cores. In one specific example, plurality of cores 140 may include six processing cores. DPU 130 also includes a networking unit 142, one or more host units 146, a memory controller 144, and one or more accelerators 148. As illustrated in FIG. 2, each of cores 140, networking unit 142, memory controller 144, host units 146, accelerators 148, and memory unit 134 including coherent cache memory 136 and non-coherent buffer memory 138 are communicatively coupled to each other.

In this example, DPU 130 represents a high performance, hyper-converged network, storage, and data processor and input/output hub. Cores 140 may comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or CISC (complex instruction set computing or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

As described herein, the new processing architecture utilizing a data processing unit (DPU) may be especially efficient for stream processing applications and environments. For example, stream processing is a type of data processing architecture well suited for high performance and high efficiency processing. A stream is defined as an ordered, unidirectional sequence of computational objects that can be of unbounded or undetermined length. In a simple embodiment, a stream originates in a producer and terminates at a consumer, and is operated on sequentially. In some embodiments, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. For example, TCP receive (Rx) processing consumes segments (fragments) to produce an ordered byte stream. The reverse processing is performed in the transmit (Tx) direction. Independently of the stream type, stream manipulation requires efficient fragment manipulation, where a fragment is as defined above.

In some examples, the plurality of cores 140 may be capable of processing a plurality of events related to each data packet of one or more data packets, received by networking unit 142 and/or host units 146, in a sequential manner using one or more "work units." In general, work units are sets of data exchanged between cores 140 and networking unit 142 and/or host units 146 where each work unit may represent one or more of the events related to a given data packet of a stream. As one example, a Work Unit (WU) is a container that is associated with a stream state and used to describe (i.e. point to) data within a stream (stored). For example, work units may dynamically originate within a peripheral unit coupled to the multi-processor system (e.g. injected by a networking unit, a host unit, or a solid state drive interface), or within a processor itself, in association with one or more streams of data, and terminate at another peripheral unit or another processor of the system. The work unit is associated with an amount of work that is relevant to the entity executing the work unit for processing a respective portion of a stream. In some examples, one or more processing cores of a DPU may be configured to execute program instructions using a work unit (WU) stack.

In some examples, in processing the plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B. Work units, including their structure and functionality, are described in more detail below with respect to FIG. 3.

DPU 130 may act as a combination of a switch/router and a number of network interface cards. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as network 7 of FIG. 1A. In this way, DPU 130 supports one or more high-speed network interfaces, e.g., Ethernet ports, without the need for a separate network interface card (NIC). Each of host units 146 may support one or more host interfaces, e.g., PCI-e ports, for connectivity to an application processor (e.g., an x86 processor of a server device or a local CPU or GPU of the device hosting DPU 130) or a storage device (e.g., an SSD). DPU 130 may also include one or more high bandwidth interfaces for connectivity to off-chip external memory (not illustrated in FIG. 2). Each of accelerators 148 may be configured to perform acceleration for various data-processing functions, such as look-ups, matrix multiplication, cryptography, compression, regular expressions, or the like. For example, accelerators 148 may comprise hardware implementations of look-up engines, matrix multipliers, cryptographic engines, compression engines, regular expression interpreters, or the like. The functionality of different hardware accelerators is described is more detail below with respect to FIG. 4.

Memory controller 144 may control access to memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. In some examples, memory controller 144 may map the accesses based on one or more of an address range, an instruction or an operation code within the instruction, a special access, or a combination thereof.

In some examples, memory controller 144 may be capable of mapping a virtual address to a physical address for non-coherent buffer memory 138 by performing a number of operations. For instance, memory controller 144 may map to non-coherent buffer memory 138 using a translation lookaside buffer (TLB) entry for a discrete stream of data packets. Moreover, memory controller 144 may map to a stream handle using the TLB entry for a continuous stream of data packets. In other examples, memory controller 144 may be capable of flushing modified cache lines associated with non-coherent buffer memory 138 after use by a first one of cores 140, e.g., core 140A. Moreover, memory controller 144 may be capable of transferring ownership of non-coherent buffer memory 138 to a second one of cores 140, e.g., core 140B, after the flushing.

In some examples, memory controller 144 may be capable of transferring ownership of a cache segment of the plurality of segments from first core 140A to second core 140B by performing a number of operations. For instance, memory controller 144 may hold onto a message generated by first core 140A. Additionally, memory controller 144 may flush the segment upon first core 140A completing an event using the segment. Furthermore, memory controller 144 may provide the message to second core 140B in response to both of: (1) there being no outstanding write operations for the segment, and (2) the segment not being flushed currently.

More details on the bifurcated memory system included in the DPU are available in U.S. patent application Ser. No. 15/949,892, filed Apr. 10, 2018, and titled "Relay Consistent Memory Management in a Multiple Processor System," the entire content of which is incorporated herein by reference. Additional details regarding the operation and advantages of the DPU are described below with respect to FIG. 3.

Figure 3:
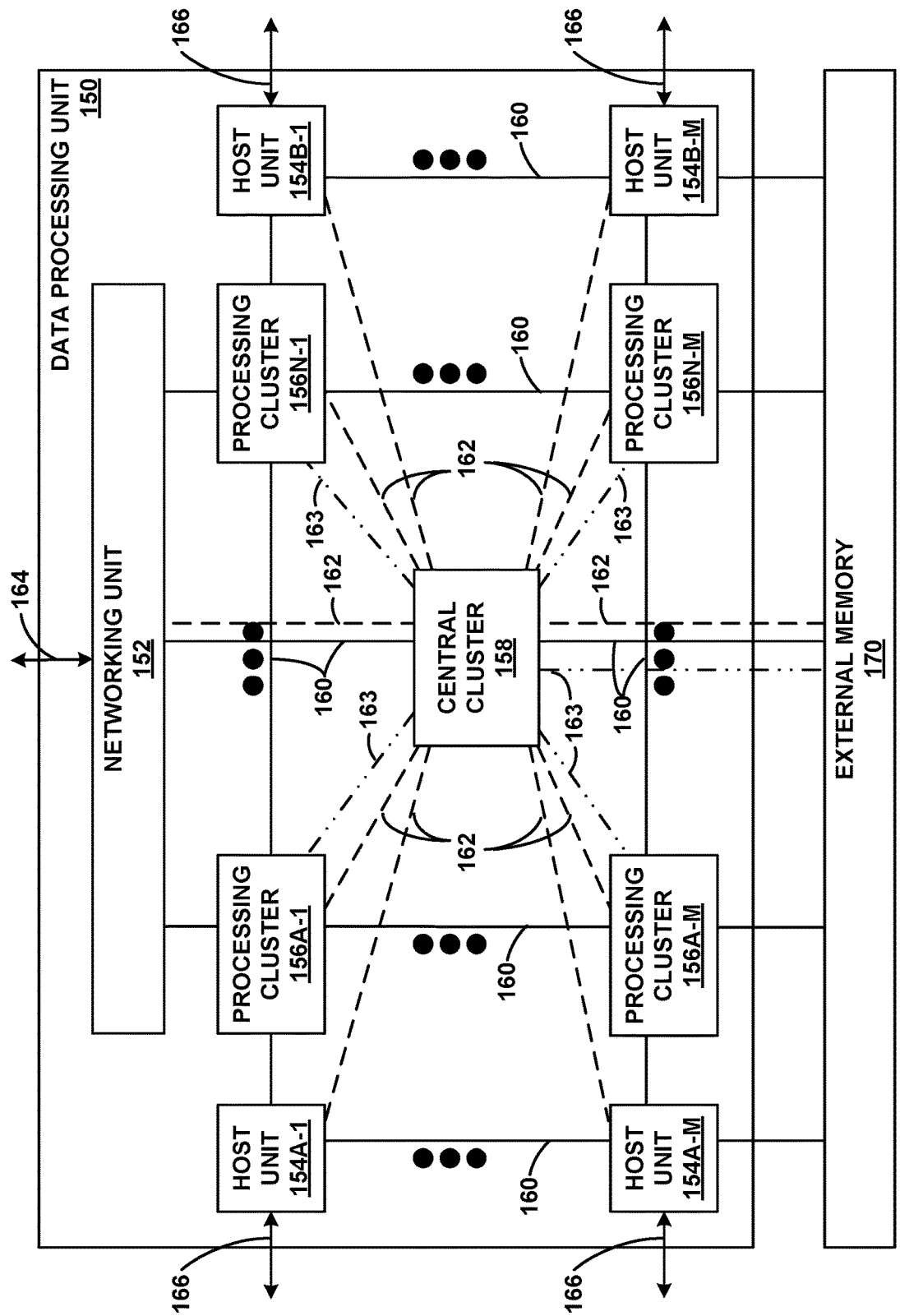
FIG. 3 is a block diagram illustrating another example data processing unit including two or more processing clusters, in accordance with the techniques of this disclosure.

FIG. 3 is a block diagram illustrating another example data processing unit 150 including two or more processing clusters, in accordance with the techniques of this disclosure. DPU 150 generally represents a hardware chip implemented in digital logic circuitry. DPU 150 may operate substantially similar to any of the DPUs of the devices within racks 20, 22, 24, or 26 of FIG. 1A, DPU 102A of FIG. 1B, DPU 102B of FIG. 1C, or DPU 102C of FIG. 1D. Thus, DPU 150 may be communicatively coupled to a CPU, a GPU, one or more network devices, server devices, random access memory, storage media (e.g., solid state drives (SSDs)), a data center fabric, or the like, e.g., via PCI-e, Ethernet (wired or wireless), or other such communication media. In this example, DPU 150 includes networking unit 152, processing clusters 156A-1-156N-M (processing clusters 156), host units 154A-1-154B-M (host units 154), and central cluster 158, and is coupled to external memory 170.

In general, DPU 150 represents a high performance, hyper-converged network, storage, and data processor and input/output hub. As illustrated in FIG. 3, DPU 150 includes host units 154 each having PCI-e interfaces 166, networking unit 152 having Ethernet interfaces 164, and processing clusters 156A-M-156N-M and host units 154A-M-154N-M each having interfaces to off-chip external memory 170. DPU 150 may include multiple lanes of PCI-e Generation 3/4 166 that are organized into groups (e.g., ×2, ×4, ×8, or ×16 groups) where each of host units 154 provides one group of PCI-e lanes 166. In addition, DPU 150 may include multiple HSS Ethernet lanes 164 that may each be 25 G and configurable as 25 G, 50 G, or 40/100 G ports. DPU 150 may also act as a PCI-e endpoint to multiple PCI-e root complexes, e.g., different sockets in multi-socket servers or multi-server enclosures. In such examples, each server may have two x86 processor sockets, each connected to DPU 150 using a dedicated PCI-e port.

In this example, DPU 150 represents a high performance, programmable multi-processor architecture that may provide solutions to various problems with existing processors (e.g., x86 architecture processors). As shown in FIG. 3, DPU 150 includes specialized network-on-chip (NoC) fabrics for inter-processor communication. DPU 150 also provides optimizations for stream processing (packet/protocol processing). Work queues are directly attached to processing cores within components of DPU 150. DPU 150 also provides run-to-completion processing, which may eliminate interrupts, thread scheduling, cache thrashing, and associated costs. DPU 150 operates on work units that associate a buffer with an instruction stream to eliminate checking overhead and allow processing by reference to minimize data movement and copy. DPU 150 also operates according to a stream model, which provides streamlined buffer handling with natural synchronization, reduces contention, and eliminates locking. DPU 150 includes non-coherent buffer memory that is separate from coherent cache memory hierarchy and eliminates cache maintenance overhead and penalty, with improved memory access. DPU 150 provides a high performance, low latency messaging infrastructure that may improve inter-process and inter-core communication. Specialized direct memory access (DMA) engines of DPU 150 handle bulk data movement and payload manipulation at exit points. Hardware offload modules of DPU 150 reduce the work needed per packet, implement ACL, and flow lookup. Hardware allocators of DPU 150 may handle memory allocation and freeing.

In general, work units are sets of data exchanged between processing clusters 156, networking unit 152, host units 154, central cluster 158, and external memory 170. Each work unit may represent a fixed length (e.g., 32-bytes) data structure including an action value and one or more arguments. In one example, a 32-byte work unit includes four sixty-four (64) bit words, a first word having a value representing the action value and three additional words each representing an argument. The action value may include a work unit handler identifier that acts as an index into a table of work unit functions to dispatch the work unit, a source identifier representing a source virtual processor or other unit (e.g., one of host units 154, networking unit 152, external memory 170, or the like) for the work unit, a destination identifier representing the virtual processor or other unit that is to receive the work unit, an opcode representing fields that are pointers for which data is to be accessed, and signaling network routing information.

The arguments of a work unit may be typed or untyped, and in some examples, one of the typed arguments acts as a pointer used in various work unit handlers. Typed arguments may include, for example, frames (having values acting as pointers to a work unit stack frame), flows (having values acting as pointers to state, which is relevant to the work unit handler function), and packets (having values acting as pointers to packets for packet and/or block processing handlers).

A flow argument may be used as a prefetch location for data specific to a work unit handler. A work unit stack is a data structure to help manage event driven, run-to-completion programming model of an operating system executed by data processing unit 150. An event driven model typically means that state which might otherwise be stored as function local variables must be stored as state outside the programming language stack. Run-to-completion also implies functions may be dissected to insert yield points. The work unit stack may provide the convenience of familiar programming constructs (call/return, call/continue, long-lived stack-based variables) to the execution model of DPU 150.

A frame pointer of a work unit may have a value that references a continuation work unit to invoke a subsequent work unit handler. Frame pointers may simplify implementation of higher level semantics, such as pipelining and call/return constructs. More details on work units, work unit stacks, and stream processing by data processing units are available in U.S. Provisional Patent Application No. 62/589,427, filed Nov. 21, 2017, entitled "Work Unit Stack Data Structures in Multiple Core Processor System," and U.S. patent application Ser. No. 15/949,692, entitled "Efficient Work Unit Processing in a Multicore System," filed Apr. 10, 2018, the entire content of each of which is incorporated herein by reference.

DPU 150 may deliver significantly improved efficiency over x86 processors for targeted use cases, such as storage and networking input/output, security and network function virtualization (NFV), accelerated protocols, and as a software platform for certain applications (e.g., storage, security, and data ingestion). DPU 150 may provide storage aggregation (e.g., providing direct network access to flash memory, such as SSDs) and protocol acceleration. DPU 150 provides a programmable platform for storage virtualization and abstraction. DPU 150 may also perform firewall and address translation (NAT) processing, stateful deep packet inspection, and cryptography. The accelerated protocols may include TCP, UDP, TLS, IPSec (e.g., accelerates AES variants, SHA, and PKC), RDMA, and iSCSI. DPU 150 may also provide quality of service (QoS) and isolation containers for data, and provide LLVM binaries.

DPU 150 may support software including network protocol offload (TCP/IP acceleration, RDMA and RPC); initiator and target side storage (block and file protocols); high level (stream) application APIs (compute, network and storage (regions)); fine grain load balancing, traffic management, and QoS; network virtualization and network function virtualization (NFV); and firewall, security, deep packet inspection (DPI), and encryption (IPsec, SSL/TLS).

In one particular example, DPU 150 may expose Ethernet ports of 100 Gbps, of which a subset may be used for local consumption (termination) and the remainder may be switched back to a network fabric via Ethernet interface 164. For each of host units 154, DPU 150 may expose a ×16 PCI-e interface 166. DPU 150 may also offer a low network latency to flash memory (e.g., SSDs) that bypasses local host processor and bus.

In the example of FIG. 3, processing clusters 156 and central cluster 158 are arranged in a grid. For example, DPU 150 may include "M" rows of "N" processing clusters. In some examples, DPU 150 may include 2 rows of 2 processing clusters for a total of 4 processing clusters 156. In other examples, DPU 150 may include 3 rows or 3 processing clusters including central cluster 158 for a total of 8 processing clusters 156 arranged with central cluster 158 in a 3×3 grid. In still other examples, DPU 150 may include more processing clusters arranged around central cluster 158. Although identified in FIG. 3 as being different than processing clusters 156, it should be understood that central cluster 158 is one of processing clusters 156 and, in some examples, may operate in the same or a similar fashion as any of processing clusters 156.

In some examples, central cluster 158 may include three conceptual processing units (not shown in FIG. 3): a central dispatch unit configured to perform flow control, select one of processing clusters 156 to perform work units, and dispatch work units to the selected one of processing clusters 156, a coherence directory unit configured to determine locations of data within coherent cache memory of DPU 150, and a central synchronization unit configured to maintain proper sequencing and ordering of operations within DPU 150. Alternatively, in other examples, any of processing clusters 156 may include these conceptual processing units.

Central cluster 158 may also include a plurality of processing cores, e.g., MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or CISC (complex instruction set computing or x86) cores. Central cluster 158 may be configured with two or more processing cores that each include at least one virtual processor. In one specific example, central cluster 158 is configured with four processing cores, each including two virtual processors, and executes a control operating system (such as a Linux kernel). The virtual processors are referred to as "virtual processors," in the sense that these processors are independent threads of execution of a single core. However, it should be understood that the virtual processors are implemented in digital logic circuitry, i.e., in requisite hardware processing circuitry.

DPU 150 may be configured according to architectural principles of using a most energy efficient way of transporting data, managing metadata, and performing computations. DPU 150 may act as an input/output (I/O) hub that is optimized for executing short instruction runs (e.g., 100 to 400 instruction runs) or micro-tasks efficiently.

DPU 150 may provide high performance micro-task parallelism using the components thereof through work management. For example, DPU 150 may couple a low latency dispatch network with a work queue interface at each of processing clusters 156 to reduce delay from work dispatching to start of execution of the work by processing clusters 156. The components of DPU 150 may also operate according to a run-to-completion work flow, which may eliminate software interrupts and context switches. Hardware primitives may further accelerate work unit generation and delivery. DPU 150 may also provide low synchronization, in that the components thereof may operate according to a stream-processing model that encourages flow-through operation with low synchronization and inter-processor communication. The stream-processing model may further structure access by multiple processors (e.g., processing cores of processing clusters 156) to the same data and resources, avoid simultaneous sharing, and therefore, reduce contention. A processor may relinquish control of data referenced by a work unit as the work unit is passed to the next processing core in line. Furthermore, DPU 150 may provide a dedicated signaling/dispatch network, as well as a high capacity data network, and implement a compact work unit representation, which may reduce communication cost and overhead.

DPU 150 may also provide memory-related enhancements over conventional architectures. For example, DPU 150 may encourage a processing model that minimizes data movement, relying as much as possible on passing work by reference. DPU 150 may also provide hardware primitives for allocating and freeing buffer memory, as well as for virtualizing the memory space, thereby providing hardware-based memory management. By providing a non-coherent memory system for stream data, DPU 150 may eliminate detrimental effects of coherency that would otherwise result in surreptitious flushes or invalidates of memory, or artifactual communication and overhead. DPU 150 also provides a high bandwidth data network that allows unfettered access to memory and peripherals such that any stream data update can be done through main memory, and stream cache-to-stream cache transfers are not required. DPU 150 may be connected through a high bandwidth interface to external memory 170.

DPU 150 may also provide features that reduce processing inefficiencies and cost. For example, DPU 150 may provide a stream processing library (i.e., a library of functions available to programmers for interfacing with DPU 150) to be used when implementing software to be executed by DPU 150. That is, the stream processing library may provide one or more application programming interfaces (APIs) for directing processing tasks to DPU 150. In this manner, the programmer can write software that accesses hardware-based processing units of DPU 150, such that a CPU can offload certain processing tasks to hardware-based processing units of DPU 150. The stream processing library may handle message passing on behalf of programs, such that meta-data and state are pushed to the cache and stream memory associated with the core where processing occurs. In this manner, DPU 150 may reduce cache misses, that is, stalls due to memory accesses. DPU 150 may also provide lock-free operation. That is, DPU 150 may be implemented according to a message-passing model that enables state updates to occur without the need for locks, or for maintaining the stream cache through coherency mechanisms. DPU 150 may also be implemented according to a stream operating model, which encourages data unit driven work partitioning and provides an intuitive framework for determining and exploiting parallelism. DPU 150 also includes well-defined hardware models that process intensive operations such as cyclical redundancy checks (CRC), cryptography, compression, and the like.

In general, DPU 150 may satisfy a goal of minimizing data copy and data movement within the chip, with most of the work done by reference (i.e., passing pointers to the data between processors, e.g., processing cores within or between processing clusters 156). DPU 150 may support two distinct memory systems: a traditional, coherent memory system with a two-level cache hierarchy, and a non-coherent buffer memory system optimized for stream processing. The buffer memory may be shared and cached at the L1 level, but coherency is not maintained by hardware of DPU 150. Instead, coherency may be achieved through machinery associated with the stream processing model, in particular, synchronization of memory updates vs. memory ownership transfer. DPU 150 uses the non-coherent memory for storing packets and other data that would not cache well within the coherent memory system.

In the example of FIG. 3, DPU 150 includes at least four processing clusters 156, although other numbers of processing clusters 156 may be used in other examples. Each of processing clusters 156 may include two or more general purpose processing cores (e.g., MIPS cores, ARM cores, PowerPC cores, RISC-V cores, or CISC or x86 cores) and one or more accelerators. In one particular example, DPU 150 includes four processing clusters 156, each including two processing cores, for a total of eight cores, and one accelerator per processing cluster. In another example, DPU 150 includes eight processing clusters 156, each including six processing cores, for a total of forty-eight cores, and two accelerators per processing cluster. In a further example, DPU 150 includes fifteen processing clusters 156, each including four processing cores, for a total of sixty cores, and two accelerators per processing cluster.

A general-purpose operating system, such as Linux or Unix, can run on one or more of processing clusters 156. In some examples, central cluster 158 may be configured differently from processing clusters 156 (which may be referred to as stream processing clusters). For example, central cluster 158 may execute the operating system kernel (e.g., Linux kernel) as a control plane. Processing clusters 156 may function in run-to-completion thread mode. That is, processing clusters 156 may operate in a tight loop fed by work queues associated with each virtual processor in a cooperative multi-tasking fashion. Processing cluster 156 may further include one or more hardware accelerator units to accelerate networking, matrix multiplication, cryptography, compression, regular expression interpretation, timer management, direct memory access (DMA), and copy, among other tasks.

Networking unit 152 includes a forwarding pipeline implemented using flexible engines (e.g., a parser engine, a look-up engine, and a rewrite engine) and supports features of IP transit switching. Networking unit 152 may also use processing cores (e.g., MIPS cores, ARM cores, PowerPC cores, RISC-V cores, or CISC or x86 cores) to support control packets and low-bandwidth features, such as packet-multicast (e.g., for OSI Layers 2 and 3). DPU 150 may act as a combination of a switch/router and a number of network interface cards. The processing cores of networking unit 152 (and/or of processing clusters 156) may perform network interface card functionality, packet switching, and the like, and may use large forwarding tables and offer programmability.

Host units 154, processing clusters 156, central cluster 158, networking unit 152, and external memory 170 may be communicatively interconnected via three types of links.

Direct links 162 (represented as dashed lines in FIG. 3) directly connect central cluster 158 to each of the other components of DPU 150, that is, host units 154, processing clusters 156, networking unit 152, and external memory 170, to form a signaling network associated with the non-coherent memory system. Direct links 163 (represented as dash-dot-dot lines in FIG. 3) directly connect central cluster 158 to each of processing clusters 156 and external memory 170 to form a coherency network associated with the coherent memory system. Additionally, grid links 160 (represented as solid lines in FIG. 3) connect neighboring components (including host units 154, processing clusters 156, networking unit 152, and external memory 170) to each other in a two-dimensional grid to form a data network. For example, host unit 154A-1 is directly coupled via grid links 160 to processing cluster 156A-1 and host unit 154A-M.

In this manner, processing clusters 156, host units 154, central cluster 158, networking unit 152, and external memory 170 are interconnected using two or three main network-on-chip (NoC) fabrics. These internal fabrics may include a data network fabric formed by grid links 160, and one or more control network fabrics including one or more of a signaling network formed by hub-and-spoke links 162, a coherency network formed by hub-and-spoke links 163, and a broadcast network formed by hub-and-spoke links 165. The signaling network, coherency network, and broadcast network are formed by direct links similarly arranged in a star-shaped network topology. Alternatively, in other examples, only the data network and one of the signaling network or the coherency network may be included. The data network is a two-dimensional mesh topology that carries data for both coherent memory and buffer memory systems. In one example, each grid link 160 provides a 512b wide data path in each direction. In one example, each direct link 162 and each direct link 163 provides a 128b wide bidirectional data path. The coherency network is a logical hub and spoke structure that carries cache coherency transactions (not including data). The signaling network is a logical hub and spoke structure that carries buffer memory requests and replies (not including data), synchronization and other commands, and work units and notifications.

DPU 150 includes various resources, i.e., elements in limited quantities that are consumed during performance of various functions. Example resources include work unit queue sizes, virtual processor cycles, accelerator cycles, bandwidth of external interfaces (e.g., host units 154 and networking unit 152), memory (including buffer memory, cache memory, and external memory), transient buffers, and time. In general, each resource can be translated to either time or space (e.g., memory). Furthermore, although certain resources can be reclaimed (such as memory), other resources (such as processing cycles and bandwidth) cannot be reclaimed.

In some examples, a broadcast network is formed by direct links 162 (or other, separate links that directly connect central cluster 158 to the other components, e.g., processing clusters 156, host units 154, networking unit 152, and external memory 170). Various components within DPU 150 (such as processing clusters 156, host units 154, networking unit 152, and external memory 170) may use the broadcast network to broadcast a utilization status of their corresponding resources to central cluster 158. Central cluster 158 may include an event queue manager (EQM) unit that stores copies of these utilization statuses for use when assigning various work units to these elements. Alternatively, in other examples, any of processing clusters 156 may include the EQM unit.

The utilization statuses may be represented as normalized color values (NCVs). Virtual processors may check the NCV of a desired resource to determine if the virtual processors can accept a work unit. If the NCV is above an allowable threshold for an initial work unit, each of the virtual processors places a corresponding flow in a pending state and sends an enqueue (NQ) event to the EQM. A flow is a sequence of computations that belong to a single ordering class. Each flow may be associated with a unique flow identifier (ID) that can be used to look up an entry for the flow in a global flow table (GFT). The flow entry may be linked to all reusable resources consumed by the flow so that these resources can be found and recovered when needed.

In response, the EQM enqueues the event into the specified event queue and monitors the NCV of the corresponding resource. If the NCV is below a desired dequeue (DQ) threshold, the EQM dequeues a calculated number of events from the head of the event queue. The EQM then translates these dequeued events into high-priority work unit messages and sends these work unit messages to their specified virtual processor destinations. The virtual processors use these dequeued events to determine if a flow can be transitioned from the pending state to an active state. For activated flows (i.e., those placed in the active state), the virtual processors may send a work unit to the desired resource. Work units that result from a reactivation are permitted to transmit if the NCV is below a threshold that is higher than the original threshold used to make the Event NQ decision as discussed above.

DPU 150 (and more particularly, networking unit 152, host units 154, processing clusters 156, and central clusters 158) uses the signaling network formed by direct links 162 to transport non-coherent buffer memory requests and replies, and work requests and notifications for inter-processor and interface unit communication (e.g., communication between processors of processing clusters 156 or processors of networking unit 152 and central cluster 158). DPU 150 (and more particularly, processing clusters 156 and central clusters 158) also uses the coherency network formed by direct links 163 to transport cache coherence requests and responses. Cores of processing clusters 156 and central cluster 158 may operate on a number of work queues in a prioritized matter. For example, each core may include one or more virtual processors, e.g., one to four virtual processors, and each virtual processor may operate on one to four work queues.

The signaling network formed by direct links 162 is a non-blocking, switched, low latency fabric that allows DPU 150 to reduce delay between event arrival (e.g., arrival of a packet on a network interface of networking unit 152 coupled to Ethernet lanes 164, arrival of a work request on one of PCI-e lanes 166 at one of host units 154, or arrival of remote procedure calls (RPCs) between processing cores of processing clusters 156 and/or central cluster 158) and start of execution by one of the cores. "Synchronization" refers to the proper sequencing and correct ordering of operations within DPU 150.

The coherency network formed by direct links 162 provide services including inter-cluster cache coherence (e.g., for request and/or reply traffic for write updates, read miss, and flush operations).

Central cluster 158 is a logical central reflection point on both the signaling network formed by direct links 162 and the coherency network formed by direct links 163 that provides ordering for data sent within the signaling network and the coherency network, respectively. Central cluster 158 generally performs tasks such as handling a global cache directory and processing synchronization and coherence transactions, ensuring atomicity of synchronized operations, and maintaining a wall-clock time (WCT) that is synchronized with outside sources (e.g., using precision time protocol (PTP), IEEE 1588). Central cluster 158 is configured to address several billion synchronization/coherence messages per second. Central cluster 158 may be subdivided into sub-units where necessary for capacity to handle aggregated traffic. Alternatively, in other examples, any of processing cluster 156 may perform the tasks described herein as being performed by central cluster 158.

As shown in FIG. 3, the data network is formed by grid links 160 and connects processing clusters 156, host units 154, central cluster 158, networking unit 152, and external memory 170. In particular, each of host unit 154A-M, processing cluster 156A-M, processing cluster 156N-M, and host unit 154B-M is connected to external memory 170 via a respective grid link 160. Although not shown in FIG. 3, data network routers are provided at intersections of columns and rows of the data network fabric (e.g., within or coupled to host units 154, processing clusters 156, and central cluster 158). These routers may be coupled to respective host units 154, processing clusters 156, and central cluster 158 via a 512b bidirectional data network links. In the example of FIG. 3, processing clusters 156A-1 and 156N-1 are shown as communicatively coupled to networking unit 152, although it should be understood that the routers for processing clusters 156A-1 and 156N-1 may in fact be communicatively coupled to networking unit 152 via grid links 160.

DPU 150 (and more particularly, networking unit 152, host units 154, processing clusters 156, and central clusters 158) use the data network formed by grid links 160 to transport buffer memory blocks to/from L1 buffer caches of cores within processing clusters 156 and central cluster 158. DPU 150 also uses the data network to transport cluster level buffer memory data, off-chip DRAM memory data, and data for external interfaces (e.g., interfaces provided by host units 154 and networking unit 152). DPU 150 also uses the data network to transport coherent memory lines to and from L2 caches of processing clusters 156, interface DMA engines, and off-chip DRAM memory.

"Messaging" may refer to work units and notifications for inter-processor and interface unit communication (e.g., between processing cores and/or processors of processing clusters 156, central cluster 158, host units 154, and networking unit 152). Central cluster 158 may include a central dispatch unit (CDU) (not shown) that is responsible for work unit (WU) queuing and flow control, work unit and completion notification dispatch, and load balancing and processor selection (e.g., selection of processors for performing work units among processing cores of processing clusters 156 and/or central cluster 158). The CDU may allow ordering of work units with respect to other messages of central cluster 158.

The CDU of central cluster 158 may also perform credit-based flow control, to manage the delivery of work units. The CDU may maintain a per-virtual-processor output queue plus per-peripheral unit queue of work units that are scheduled by the CDU, as the destination virtual processors allow, as a flow control scheme and to provide deadlock avoidance. The CDU may allocate each virtual processor of cores of processing clusters 156 a fixed amount of storage credits, which are returned when space is made available. The work queues may be relatively shallow. The CDU may include a work scheduling system that manages work production to match the consumption rate (this does not apply to networking unit 152, and may be performed via scheduling requests for storage). Processing clusters 156 switch work units destined for virtual processors within a common one of processing clusters 156 locally within the processing cluster's work unit queue system.

In general, central cluster 158 ensures that the ordering of messages of the same type (e.g., coherence, synchronization, or work units) seen on an output towards a cluster or peripheral is the same as the order in which the messages were seen at each input to central cluster 158. Ordering is not specified between multiple messages received from different inputs by central cluster 158. Alternatively, in other examples, any of processing cluster 156 may include the CDU and perform the tasks described herein as being performed by central cluster 158.

Networking unit 152 may expose Ethernet lanes 164 for connectivity to a network, such as network 7 of FIG. 1A. In one particular example, networking unit 152 may expose twenty-four high speed symmetrical (HSS) Ethernet lanes (e.g., for 25 Gbps). Each of host units 154 may expose PCI-e lanes 166 for connectivity to host devices (e.g., servers) and data storage devices, e.g., solid state drives (SSDs). In one particular example, each of host units 152 may expose a number of PCI-e lanes 166, which may be bifurcatable into multiple independent ports. In this example, DPU 150 may be connected to four servers via two processor sockets per server using at least one PCI-e lane to each socket, and to eight SSDs using at least one PCI-e lane to each SSD.

Networking unit 152 connects to an Ethernet network via Ethernet lanes 164 and interfaces to the data network formed by grid links 160 and the signaling network formed by direct links 162, i.e., the data and signaling internal fabrics. Networking unit 152 provides a Layer 3 (i.e., OSI networking model Layer 3) switch forwarding path, as well as network interface card (NIC) assistance.

As NIC assistance, networking unit 152 may perform various stateless assistance processes, such as checksum offload for Internet protocol (IP), e.g., IPv4 or IPv6, transmission control protocol (TCP), and/or uniform datagram protocol (UDP). Networking unit 152 may also perform assistance processes for receive side-scaling (RSS), large send offload (LSO), large receive offload (LRO), virtual local area network (VLAN) manipulation, and the like. On the Ethernet media access control (MAC) side, in one example, networking unit 152 may use multiple combination units, each with four 25 Gb HSS lanes that can be configured as 1×40/100 G, 2×50 G, or 4×25/10/1 G. Networking unit 152 may also support Internet protocol security (IPsec), with a number of security associations (SAs). Networking unit 152 may include cryptographic units for encrypting and decrypting packets as necessary, to enable processing of the IPsec payload.

Networking unit 152 may also include a flexible network packet parsing unit. The packet parsing unit may be configured according to a specialized, high-performance implementation for common formats, including network tunnels (e.g., virtual extensible local area network (VXLAN), network virtualization using generic routing encapsulation (NVGRE), generic network virtualization encapsulation (GENEVE), multiprotocol label switching (MPLS), or the like). Networking unit 152 may also include an OSI Layer 3 (L3) switch that allows cut-through Ethernet to Ethernet switching, using a local memory (not shown) of networking unit 152, as well as host-to-host switching.

One or more hardware direct memory access (DMA) engine instances (not shown) may be attached to three data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 provide interfaces to respective PCI-e bus lanes 166. This allows DPU 150 to operate as an endpoint or as a root (in dual mode). For example, DPU 150 may connect to a host system (e.g., an x86 server) as an endpoint device, and DPU 150 may connect as a root to endpoint devices, such as SSD disks, as shown in FIGS. 1 and 2.

In the example of FIG. 3, DPU 150 includes 2 columns of "M" host units 154. In some examples, DPU 150 may include 2 columns of 2 for a total of four host units 154. In other examples, DPU 150 may include 2 columns of 3 for a total of six host units. In still other examples, DPU 150 may only include one host unit. Although illustrated in a grid pattern with processing clusters 156 in FIG. 3, in other examples DPU 150 may include any number of host units not necessarily tied to rows of processing clusters. In one particular example, each of host units 154 exposes 16 PCI-e lanes 166, divisible into granularity of ×4 units (e.g., for SSD) or ×8 units for system connectivity. Host units 154 may include respective bifurcated controllers (not shown) that are separate entities. Each of host units 154 may include one or more controllers, e.g., one controller per set of ×4 PCI-e lanes. In general, each of host units 154 includes respective virtualization resources that are not shared among other host units 154.

Each of host units 154 may also include a respective hardware DMA engine (not shown). Each DMA engine is configured to fetch data and buffer descriptors from host memory, and to deliver data and completions to host memory. Each DMA engine also sends messages to the PCI controller to trigger interrupt generation. Additional functionality may be provided by core processing units of host units 154 that execute software, which consume streams of buffer descriptors, such as generating DMA addresses for payload placement and/or generating completion addresses.

Processing clusters 156 and central cluster 158 may perform data protection mechanisms to protect data stored in on- or off-chip memory, such as in buffers or in external memory 170. Such data protection mechanisms may reduce or eliminate silent data corruption (SDC) probability with single bit soft errors (such errors may occur due to radiation, cosmic rays, internally generated alpha particles, noise, etc. . . . ) and escaped multi-bit errors.

DPU 150 may execute various types of applications. Examples of such applications are classified below according to three axes: layering, consumption model, and stream multiplexing. Three example layers of software/applications within the context of DPU 150 include access software, internal software, and applications. Access software represents system software, such as drivers and protocol stacks. Such access software is typically part of the kernel and runs in root/privileged mode, although in some cases, protocol stacks may be executed in user space. Internal software includes further system software and libraries, such as storage initiator/target software that execute on top of the access software. Traditionally, internal software is executed in kernel space. Applications represent user applications that execute in user space. Consumption models can be broadly classified on a spectrum with a protocol processing model (header consumption) at one end and byte processing model (data consumption) at the other end. Typically, system software is near the protocol processing model end, and user applications tend to form the majority of applications at the byte processing model end.

Table 1 below categorizes example software/applications according to the various layers and consumption models discussed above:

TABLE 1

| | Application Classification | | | |
|---|---|---|---|---|
| | | Layering | | |
| | Streams | Access | Internal | Applications |
| Consumption | Header Payload | Drivers — | Storage Compression Encryption | Firewall Deep packet inspection |

In this manner, DPU 150 may offer improvements over conventional processing systems with respect to work management, memory management, and/or processor execution.

Figure 4:
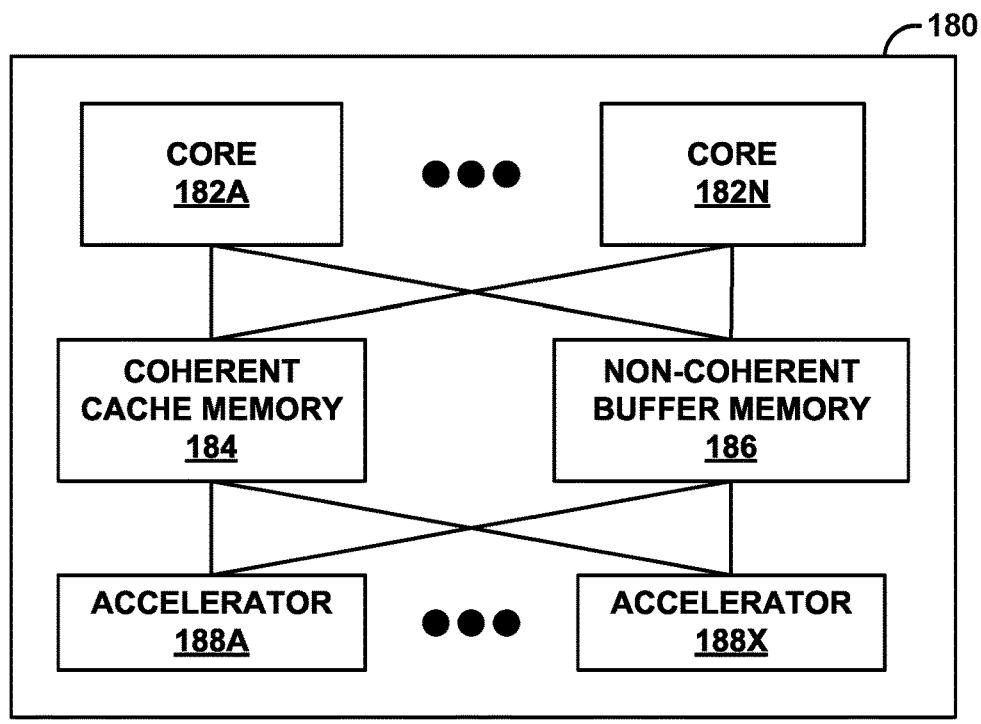
FIG. 4 is a block diagram illustrating an example processing cluster including a plurality of programmable processing cores.

FIG. 4 is a block diagram illustrating an example processing cluster 180 including a plurality of programmable processing cores 182A-182N. Each of processing clusters 156 of DPU 150 of FIG. 3 may be configured in a manner substantially similar to that shown in FIG. 4. In this example, processing cluster 180 includes cores 182A-182N ("cores 182"), coherent cache memory 184, non-coherent buffer memory 186, and accelerators 188A-188X ("accelerators 188"). In one example, processing cluster 180 may include two processing cores 182 and at least one accelerator 188. In another example, processing cluster 180 may include six processing cores 182 and two accelerators 188. As noted above, a DPU (such as DPU 150 of FIG. 3) may support two distinct memory systems: a coherent memory system and a non-coherent buffer memory system. In the example of FIG. 4, coherent cache memory 184 represents part of the coherent memory system (e.g., coherent cache memory 184 may comprise a level two (L2) coherent cache memory where cores 182 may also include one or more level one (L1) data caches, e.g., as discussed with respect to FIG. 5 below), while non-coherent buffer memory 186 represents part of the non-coherent buffer memory system. Cores 182 may represent the processing cores discussed with respect to DPU 150 of FIG. 3. Cores 182 may share non-coherent buffer memory 186, which in one example may be a 2 MB buffer memory. As one example, cores 182 may use non-coherent buffer memory 186 for sharing streaming data, such as network packets.

In general, accelerators 188 perform acceleration for various data-processing functions, such as look-ups, matrix multiplication, cryptography, compression, regular expressions, or the like. That is, accelerators 188 may comprise hardware implementations of look-up engines, matrix multipliers, cryptographic engines, compression engines, regular expression interpreters, or the like. For example, accelerators 188 may include a lookup engine that performs hash table lookups in hardware to provide a high lookup rate. The lookup engine may be invoked through work units from external interfaces and virtual processors of cores 182, and generates lookup notifications through work units. Accelerators 188 may also include one or more cryptographic units to support various cryptographic processes, such as any or all of Advanced Encryption Standard (AES) 128, AES 256, Galois/Counter Mode (GCM), block cipher mode (BCM), Secure Hash Algorithm (SHA) 128, SHA 256, SHA 512, public key cryptography, elliptic curve cryptography, RSA, or the like. One or more of such cryptographic units may be integrated with networking unit 152 (FIG. 3), in some examples, to perform Internet protocol security (IPsec) cryptography and/or secure sockets layer (SSL) cryptography. Accelerators 188 may also include one or more compression units to perform compression and/or decompression, e.g., according to ZIP, PKZIP, GZIP, Lempel-Ziv, public format compression such as Snappy, or the like. The compression units may be configured to perform gather-list-based data consumption and/or scatter-list-based data delivery. The compression units may receive work requests and provide work notifications. The compression units may have access to hardware allocators of DPU 150 that handle memory allocation and freeing, e.g., within external memory 170 (FIG. 3), since the size of the output buffer for decompression may not be known a-priori.

Figure 5:
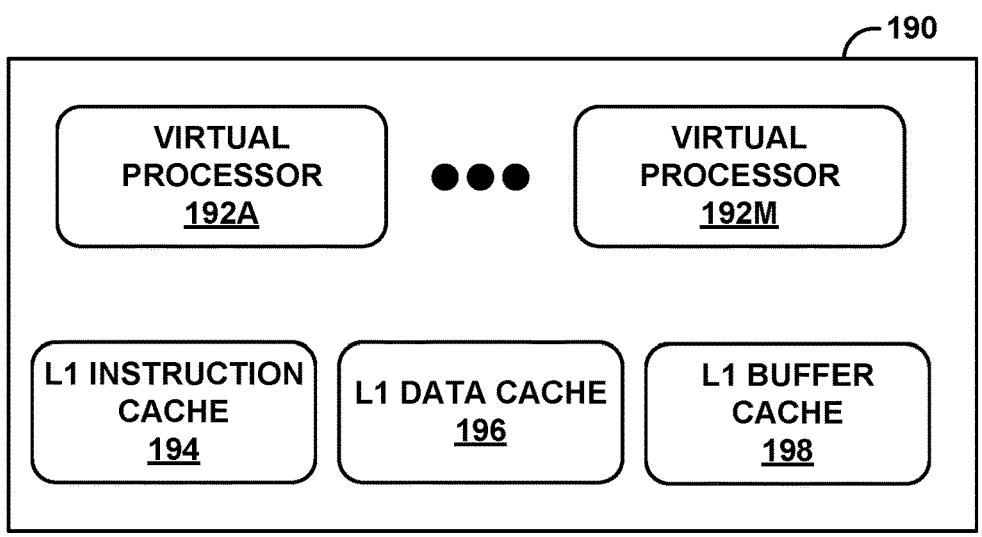
FIG. 5 is a block diagram illustrating an example programmable processing core.

FIG. 5 is a block diagram illustrating components of an example programmable processing core 190. Each of cores 140 of FIG. 2 and each of cores 182 of FIG. 4 may include components substantially similar to those of core 190 of FIG. 5. In this example, core 190 may be a dual-issue with dual integer unit, and is configured with one or more hardware threads referred to as Virtual Processors (VPs) 192A-192M ("VPs 192"). Core 190 also includes a level 1 (L1) instruction cache 194 and a L1 data cache 196, each of which may be 64 KB. When each of cores 140 of FIG. 3 includes an L1 data cache similar to L1 data cache 196, the L1 data caches of cores 140 may share coherent cache memory 136 of FIG. 3. Similarly, when each of cores 182 of FIG. 4 includes an L1 data cache similar to L1 data cache 196, the L1 data caches of cores 182 may share L2 coherent cache memory 184 of FIG. 4, which may result in a total cache size for processing cluster 180 (FIG. 4) of 2 MB.

Core 190 also includes a L1 buffer cache 198, which may be 16 KB. Core 190 may use L1 buffer cache 198 for non-coherent data, such as packets or other data for software managed through stream processing mode. L1 buffer cache 198 may store data for short-term caching, such that the data is available for fast access.

When one of virtual processors 192, such as virtual processor 192A, accesses memory, virtual processor 192A uses L1 data cache 196 or L1 buffer cache 198, based on the physical memory address issued by a memory management unit (not shown). DPU 150 (FIG. 3) and components thereof, such as processing clusters 156 and cores thereof (such as cores 182 of FIG. 4), may be configured to split memory space into separate ranges for buffer memory and coherent memory, e.g., by using high order address bits, which allows the ranges to be mapped to either buffer memory or coherent memory.

Various examples have been described. These and other examples are within the scope of the following claims.

What is claimed is:

1. A data processing unit configurable for communicatively coupling to one or more storage devices and to one or more application processors, the data processing unit comprising:
    a plurality of programmable processing cores configured to perform processing tasks on packet-based data, wherein, to perform the processing tasks, one of the plurality of programmable processing cores is configured to execute a work unit function to process a work unit associated with a portion of the packet-based data, wherein the work unit comprises a data structure that includes a pointer to the portion of the packet-based data in memory, a first identifier that specifies the work unit function for processing the portion of the packet-based data, and a second identifier that specifies the one of the plurality of programmable processing cores included in the data processing unit for executing the work unit function; and
    one or more interfaces configured to communicate the packet-based data between the data processing unit and one or more of a network, the storage devices, or the application processors based at least on one or more of the pointer, the first identifier, and the second identifier.

2. The data processing unit of claim 1, wherein the one or more interfaces include at least one network interface, the data processing unit further comprising a networking unit including the at least one network interface, the networking unit configured to control communication of the packet-based data between the data processing unit and the network over the at least one network interface.

3. The data processing unit of claim 2, wherein the at least one network interface includes at least one Ethernet interface, wherein the networking unit is configured to support the at least one Ethernet interface to connect directly to the network without a separate network interface card (NIC).

4. The data processing unit of claim 1, wherein the one or more interfaces include at least one host interface, the data processing unit further comprising at least one host unit including the at least one host interface, the at least one host unit configured to control communication of the packet-based data between the data processing unit and at least one of the one or more storage devices over the at least one host interface.

5. The data processing unit of claim 4, wherein the at least one host interface includes at least one PCI-e (Peripheral Component Interconnect-Express) interface, wherein the at least one host unit is configured to support the at least one PCI-e interface to connect directly to the at least one of the one or more storage devices.

6. The data processing unit of claim 1, wherein the one or more interfaces include at least one host interface, the data processing unit further comprising at least one host unit including the at least one host interface, the at least one host unit configured to control communication of the packet-based data between the data processing unit and at least one of the one or more application processors over the at least one host interface.

7. The data processing unit of claim 6, wherein the at least one host interface includes at least one PCI-e (Peripheral Component Interconnect-Express) interface, wherein the at least one host unit is configured to support the at least one PCI-e interface to connect directly to the at least one of the one or more application processors.

8. The data processing unit of claim 1,
    wherein the data processing unit communicatively couples to the one or more storage devices and the one or more application processors via respective system bus connections; and
    wherein the one or more interfaces are configured to communicate the packet-based data to the respective system bus connections to one or more of the storage devices or the application processors.

9. The data processing unit of claim 1, wherein at least one of the application processors comprises a central processing unit (CPU), and wherein the data processing unit is positioned between and communicatively coupled to the CPU and the storage devices, wherein the data processing unit is configured to retrieve the data from the storage devices on behalf of the CPU, store the data to the storage devices on behalf of the CPU, and retrieve the data from the network on behalf of the CPU.

10. The data processing unit of claim 1, wherein at least one of the application processors comprises a graphics processing unit (GPU), and wherein the data processing unit is positioned between and communicatively coupled to the GPU and the storage devices, wherein the data processing unit is configured to feed the data from at least one of the network or the storage devices to the GPU for processing.

11. A device comprising at least one data processing unit configurable for communicatively coupling to one or more storage devices and to one or more application processors, the data processing unit configured to:
perform processing tasks on packet-based data, wherein, to perform the processing tasks, the data processing unit is configured to execute a work unit function to process a work unit associated with a portion of the packet-based data, wherein the work unit comprises a data structure that includes a pointer to the portion of the packet-based data in memory, a first identifier that specifies the work unit function for processing the portion of the packet-based data, and a second identifier that specifies one of a plurality of programmable processing cores included in the data processing unit for executing the work unit function, and
control communication of the packet-based data between the data processing unit and one or more of a network, the storage devices, or the application processors based at least on one or more of the pointer, the first identifier, and the second identifier.

12. The device of claim 11, wherein the data processing unit comprises a networking unit including at least one network interface, the networking unit configured to control communication of the packet-based data between the data processing unit and the network over the at least one network interface.

13. The device of claim 11, wherein the data processing unit further comprises at least one host unit including at least one host interface, the at least one host unit configured to control communication of the packet-based data between the data processing unit and at least one of the one or more storage devices over the at least one host interface.

14. The device of claim 11, wherein the data processing unit further comprises at least one host unit including at least one host interface, the at least one host unit configured to control communication of the packet-based data between the data processing unit and at least one of the one or more application processors over the at least one host interface.

15. The device of claim 11,
wherein the data processing unit communicatively couples to the one or more storage devices and the one or more application processors via respective system bus connections; and
wherein the one or more interfaces are configured to communicate the packet-based data to the respective system bus connections to one or more of the storage devices or the application processors.

16. The device of claim 11, wherein at least one of the application processors comprises a central processing unit (CPU), and wherein the data processing unit is positioned between and communicatively coupled to the CPU and the storage devices, wherein the data processing unit is configured to retrieve the data from the storage devices on behalf of the CPU, store the data to the storage devices on behalf of the CPU, and retrieve the data from the network on behalf of the CPU.

17. The device of claim 11, wherein at least one of the application processors comprises a graphics processing unit (GPU), and wherein the data processing unit is positioned between and communicatively coupled to the GPU and the storage devices, wherein the data processing unit is configured to feed the data from at least one of the network or the storage devices to the GPU for processing.

18. The device of claim 11, wherein the device includes the at least one data processing unit and at least one of the one or more storage devices.

19. The device of claim 11, wherein the device includes the at least one data processing unit and at least one of the one or more application processors.

20. The device of claim 11, wherein the device includes the at least one data processing unit, at least one of the one or more application processors, and at least one of the one or more storage devices.

* * * * *